United States Patent [19]

Iimura et al.

[11] Patent Number: 5,056,896
[45] Date of Patent: Oct. 15, 1991

[54] LIQUID CRYSTAL DISPLAY DEVICE WITH DIELECTRIC ANISOTROPY

[75] Inventors: Haruo Iimura, Yokohama; Yasuyuki Takiguchi, Kawasaki; Akihiko Kanemoto; Kenya Yokoi, both of Yokohama; Takamichi Enomoto, Shiroyama, all of Japan

[73] Assignee: Ricoh Company, Ltd., Tokyo, Japan

[21] Appl. No.: 400,012

[22] Filed: Aug. 29, 1989

[30] Foreign Application Priority Data

| Aug. 29, 1988 | [JP] | Japan | 63-214415 |
| Oct. 18, 1988 | [JP] | Japan | 63-261995 |
| Dec. 23, 1988 | [JP] | Japan | 63-325297 |

[51] Int. Cl.⁵ ............................................ G02F 1/13
[52] U.S. Cl. ............................. 359/63; 359/93; 359/92; 359/94
[58] Field of Search ............ 350/347 E, 347 R, 337, 350/339 R, 347 V, 341

[56] References Cited

U.S. PATENT DOCUMENTS

| 4,497,542 | 2/1985 | Kaye | 350/347 E |
| 4,653,861 | 3/1987 | Kando et al. | 350/337 |
| 4,701,028 | 10/1987 | Clerc et al. | 350/339 R |
| 4,759,612 | 7/1988 | Nakatsuka et al. | 350/338 |
| 4,813,770 | 3/1989 | Clerc et al. | 350/339 R |
| 4,844,569 | 7/1989 | Wada et al. | 350/347 E |
| 4,852,976 | 8/1989 | Suzuki | 350/339 R |
| 4,889,412 | 12/1989 | Clerc et al. | 350/339 R |

FOREIGN PATENT DOCUMENTS

| 60-159729 | 8/1985 | Japan | 350/337 |
| 62-89020 | 4/1987 | Japan | 350/337 |
| 62-240928 | 10/1987 | Japan | 350/337 |
| 62-267722 | 11/1987 | Japan | 350/347 E |

Primary Examiner—William Mintel
Assistant Examiner—Minhloan Tran
Attorney, Agent, or Firm—Oblon, Spivak, McClelland, Maier & Neustadt

[57] ABSTRACT

Disclosed herein is a liquid crystal display device comprising (1) a liquid crystal cell wherein a liquid crystal layer comprising a liquid crystal component having positive dielectric anisotropy is sandwiched between a pair of substrates having at least one electrode, (2) a pair of polarizers arranged to sandwich the liquid crystal layer therebetween and (3) a birefringence layer provided between the liquid crystal layer and the polarizer on at least one side of the liquid crystal layer, wherein the angle formed between the maximum refractive index direction in the birefringence layer face and the direction of transmission axis or absorption axis of polarizer adjacent to the birefringence layer is not more than 5°.

5 Claims, 11 Drawing Sheets

LIQUID CRYSTAL DISPLAY DEVICE WITH DIELECTRIC ANISOTROPY

BACKGROUND OF THE INVENTION

The present invention relates to a liquid crystal display device wherein liquid crystal molecules in a liquid crystal layer are structured to be largely twisted between a pair of substrates, particularly, relates to a liquid crystal device of STN (Super Twisted Nematic) type or OMI (Optical Mode Interference) type formed in a monochrome type based on the STN type liquid crystal device. Further, the present invention relates to ECB (Electrically Controlled Birefringence) type liquid crystal device wherein liquid crystal molecules are structured to be oriented homogenously between a pair of substrates.

The liquid crystal device of the present invention can be used widely in various displays.

In recent years, developments and researches for the liquid crystal display device have been remarkably proceeded, for example, the STN type liquid crystal display device has been developed in place of formerly general TN type (Twisted Nematic type). In the STN type liquid crystal device, liquid crystal molecules are structured to be twisted largely between a pair of substrates, and the orientation direction of liquid crystal molecules on the substrate and the transmission axis (absorption axis) of each polarizer are arranged at a certain angle to allow the liquid crystal to be provided with a birefringence effect.

In the STN type liquid crystal device as mentioned above, since the orientation direction of liquid crystal is changed nearby the threshold voltage and the displayed color changes by the birefringence effect in accordance with the drive voltage, a speedy luminance change by the voltage and an excellent time-division characteristic can be obtained.

However, on the other hand, since the STN type liquid crystal device uses the birefringence effect of the liquid crystal, the displayed color is changed in accordance with the product $\Delta n \cdot d$ of the refractive index anisotropy $\Delta n$ and the thickness d of liquid crystal layer. The above $\Delta n \cdot d$ has an appearance value changeable in accordance with the visual angle direction, namely the direction of seeing the liquid crystal display device. Therefore, there is a problem that the displayed color looks changeable in accordance with the visual angle direction.

The first aspect of the present invention is to provide a STN type liquid crystal display device in which the display color change caused by the visual angle direction is reduced and the visual angle characteristic is improved.

Since the present STN type liquid crystal display device uses the birefringence effect of liquid crystal, the liquid crystal cell is colored, therefore, it is hard to obtain a color liquid crystal display device. Further, a color tone ununiformity in the liquid crystal cell is caused by the slight change of the liquid crystal cell thickness.

In view of the problem as described above, in recent years, the OMI type liquid crystal display device formed by rendering the STN type liquid crystal display device monochrome by adjusting the angle of a polarizer and the retardation value has been developed.

However, since such an OMI type liquid crystal display device uses the birefringence effect of the liquid crystal like the STN type liquid crystal device, the displayed color is changed in accordance with the product $\Delta n \cdot d$ of the refractive index anisotropy $\Delta n$ and the thickness d of liquid crystal layer. The above $\Delta n \cdot d$ changes in an appearance value in accordance with the visual angle direction, namely the direction of seeing the liquid crystal display device. Therefore, there is a problem that the color looks changeable in accordance with the visual angle direction.

Therefore, the second aspect of the present invention is to provide OMI type liquid crystal display device in which the display color change caused by the visual angle direction is reduced and the visual angle characteristic is improved.

On the other hand, an ECB type liquid crystal display device utilizing the birefringence effect electrically controlled has a structure that a liquid crystal cell sandwiches therebetween the liquid crystal layer to perform the liquid crystal molecules to be oriented homogenously between the upper and lower substrates, and polarizers are arranged on both sides of the liquid crystal cell so that the transmission axis or absorption axis of the polarizer nearby the liquid crystal layer is shifted from the orientation direction of the liquid crystal molecules, thereby the liquid crystal cell can be colored by utilizing the birefringence property of liquid crystal molecules. And the displayed color is changed in accordance with the variable orientation state of the liquid crystal layer by applied voltage. For example, Japanese Patent Laid-Open SHO 62-275227, corresponding to U.S. Pat. No. 4,813,770, discloses the ECB type liquid crystal display device of the DAP system performing a light modulation by changing the birefringence degree of liquid crystal layer while applying the voltage to the vertically oriented liquid crystal layer.

However, the conventional ECB type liquid crystal display device has the problem that the displayed color is remarkably changed in accordance with the visual angle direction for the reason that the distance in liquid crystal layer where the light is actually passing through is changed by the visual angle and the degree of birefringence in appearance is changed in accordance with the relative angle formed between the orientation direction of liquid crystal molecules and the visual angle direction.

The third aspect of the present invention is to provide the ECB type liquid crystal display device which is formed without such a disadvantage as described above, and is remarkably less in change of displayed color dependent on the visual angle and excellent in display quality.

Namely, the present inventors have proceeded their research for finding a solution to the problem in the conventional liquid crystal display device, and found that the liquid crystal display device superior to the conventional each type of liquid crystal display device in the visual angle characteristic is obtained by utilizing the liquid crystal display device which comprises (1) a liquid crystal cell wherein the liquid crystal layer comprising a liquid crystal component having a positive dielectric anisotropy is sandwiched between a pair of substrates, (2) a pair of polarizers arranged to sandwich the liquid crystal layer therebetween and (3) a birefringence layer having refractive index anisotropy and transparency provided between the liquid crystal layer and the polarizer on at least one side of the liquid crystal layer, wherein the angle formed between the maximum refractive index direction of the birefringence layer face and the direction of transmission axis or absorption axis of the polarizer adjacent to the birefringence layer is not more than 5°.

Namely, the present inventors found that the ECB type liquid crystal display device which is excellent in visual angle characteristic can be obtained by structuring so that the liquid crystal molecules in the liquid crystal cell of the above liquid crystal display device are oriented homogeneously between the pair of substrates, and they have been succeeded the present invention based on this finding.

Further, the present inventors found that the excellent STN type liquid crystal display device can be obtained from the liquid crystal display device having (1) the above-mentioned conditions and (2) the construction that its liquid crystal molecules are remarkably twisted in the liquid crystal layer between a pair of substrates, wherein the orientation direction of liquid crystal molecules adjacent to the polarizer is shifted from the direction of a transmission axis or absorption axis of the polarizer, and the angle of the direction of optical axis in the birefringence layer projected to the birefringence layer face formed to the orientation direction of liquid crystal molecules adjacent to the birefringence layer is limited in certain positive or negative angle ranges. Further, they found that the excellent OMI type liquid crystal display device can be obtained by limiting (1) the product of refractive index anisotropy $\Delta n$ of the liquid crystal component and the thickness d of liquid crystal layer, (2) the angle formed between the transmission axis of both polarizers and (3) the angle formed between the orientation direction of liquid crystal molecules in the center of the thickness of liquid crystal layer and the bisector between transmission axes of the pair of polarizers, respectively in certain ranges, and have been succeeded the present invention based on these findings.

Namely, the STN type, OMI type and ECB type liquid crystal display devices of the present invention have advantages that the color change in accordance with the visual angle change is decreased and that high contrast displayed images can be generated.

SUMMARY OF THE INVENTION

In a first aspect of the present invention there is provided a liquid crystal display device, comprising:
(1) a liquid crystal cell wherein a liquid crystal layer comprising a liquid crystal composition having positive dielectric anisotropy is sandwiched between a pair of substrates having at least one electrode, and liquid crystal molecules are oriented substantially in parallel to the surface of said substrates and are structured to be twisted at an angle of not less than 180° a perpendicular direction to a surface of substrate when the voltage is not applied;
(2) a pair of polarizers arranged to sandwich said liquid crystal cell therebetween; and
(3) a birefringence layer provided between said liquid crystal layer and said polarizer on at least one side of said liquid crystal layer,
wherein the direction of transmission axis or absorption axis of said polarizer is formed to be shifted from the orientation direction of liquid crystal molecules adjacent to said polarizer, the angle formed between the maximum refractive index direction in said birefringence layer face and the direction of transmission axis or absorption axis of said polarizer adjacent to said birefringence layer is not more than 5°, and an angle ($\delta$) of direction (A) formed to the orientation direction (C) of liquid crystal molecules adjacent to said birefringence layer is in the range of 0° to 90°, provided that the twist direction of liquid crystal molecules to the front side from the birefringence layer side is the positive direction, the direction (A) is one of the directions (A) and (B) of the optical axes in the birefringence layer projected to said birefringence layer face, and the angle ($\delta$) of the direction (A) formed to the direction (C) is smaller than the angle of the direction (B) formed to the direction (C) when the direction (A) does not coincide with the direction (B).

In a second aspect of the present invention, there is provided a liquid crystal display device, comprising:
(1) a liquid crystal cell wherein a liquid crystal layer comprising a liquid crystal composition having positive dielectric anisotropy is sandwiched between a pair of substrates having at least one electrode, and liquid crystal molecules are oriented substantially in parallel to the surface of said substrates and are structured to be twisted at an angle of not more than 180° in the thickness direction of liquid crystal layer between said pair of substrates when the voltage is not applied;
(2) a pair of polarizers arranged to sandwich said liquid crystal cell therebetween; and
(3) a birefringence layer provided between said liquid crystal layer and said polarizer on at least one side of said liquid crystal layer,
wherein the direction of transmission axis or absorption axis of said polarizer is formed to be shifted from the orientation direction of liquid crystal molecules adjacent to said polarizer, the angle formed between the maximum refractive index direction in said birefringence layer face and the direction of transmission axis or absorption axis of said polarizer adjacent to said birefringence layer is not more than 5°, and an angle ($\delta$) of direction (A) formed to the orientation direction (C) of liquid crystal molecules adjacent to said birefringence layer is in the range of 0° to −90°, provided that the twist direction of liquid crystal molecules to the front side from the birefringence layer side is the positive direction, the direction (A) is one of the directions (A) and (B) of the optical axes in the birefringence layer projected to said birefringence layer face, and the angle ($\delta$) of the direction (A) formed to the direction (C) is smaller than the angle of the direction (B) formed to the direction (C) when the direction (A) does not coincide with the direction (B).

In a third aspect of the present invention, there is provided a liquid crystal display device, comprising:
(1) a liquid crystal cell wherein a liquid crystal layer comprising a liquid crystal composition having positive dielectric anisotropy is sandwiched between a pair of substrates having at least one electrode, and liquid crystal molecules are oriented substantially in parallel to the surface of said substrates and are structured to be twisted at an angle of not less than 160° a perpendicular direction to a surface of the substrate when the voltage is not applied;
(2) a pair of polarizers arranged to sandwich said liquid crystal cell therebetween; and
(3) a birefringence layer provided between said liquid crystal layer and said polarizer on at least one side of said liquid crystal layer, wherein the product $\Delta n \cdot d$ of the refractive index anisotropy $\Delta n$ of said liquid crystal component and the thickness d of liquid crystal layer at normal temperature is in the range of 0.4 to 0.9 $\mu$m, and the angle ($\beta$) of the transmission axis of the polarizer adjacent to the one substrate (a) of liquid crystal cell formed to the transmission axis of the other polarizer adjacent to the other substrate (b) of liquid crystal cell is in the range of 60° to 90° provided that the twist direction of said liquid crystal molecules from the substrate (b) to the substrate (a) is the positive direction, the angle ($\epsilon$) formed between the orientation direction of said liquid crystal molecules in the center of thickness of said liquid crystal layer and the bisector between the transmission axes of a pair of said polarizers is in the range of 30° to 60°, and the angle formed between the maximum refractive index direction in said birefringence layer face and the direction of transmission axis or absorption axis of said polarizer adjacent to said birefringence layer is not more than 5°.

In a fourth aspect of the present invention, there is provided a liquid crystal display device, comprising:

(1) a liquid crystal cell wherein a liquid crystal layer comprising a liquid crystal composition having positive dielectric anisotropy is structured so that liquid crystal molecules in said liquid crystal layer are homogeneously oriented between a pair of substrates having at least one electrode;

(2) a pair of polarizers arranged to sandwich said liquid crystal layer therebetween;

(3) a birefringence layer provided between said liquid crystal layer and said polarizer on at least one side of said liquid crystal layer;

wherein the angle formed between the maximum refractive index direction in said birefringence layer face and the direction of transmission axis or absorption axis of said polarizer adjacent to said birefringence layer is not more than 5°.

BRIEF EXPLANATION OF THE DRAWINGS

FIG. 1 is a cross sectional structural view of the STN type liquid crystal display device and the OMI type liquid crystal display device, FIG. 2 is a cross sectional structural view of the STN type liquid crystal display device and the OMI type liquid crystal display device showing an integrated structure of the birefringence layer with a liquid crystal cell, FIG. 3 is a cross sectional view showing one embodiment of the ECB type liquid crystal display device, FIG. 4 is a cross sectional view showing another embodiment of the ECB type liquid crystal display device, FIG. 5 is a cross sectional view of the construction of the polarizer shown in FIG. 4, FIG. 6 is a perspective view showing the definition of direction regarding the birefringence layer in each liquid crystal display device, FIG. 7 is a perspective view showing the definition of visual angle direction in each liquid crystal display device.

FIGS. 8 through 13 relate to the STN type liquid crystal display device, FIG. 8 is an explanatory view showing the angle relation among each parts, FIG. 9 is an explanatory view showing the relation between the directions of the optical axes in the birefringence layer projected to the birefringence layer face and the orientation direction of liquid crystal molecules, FIG. 10 is a characteristic view showing the color changes in accordance with the visual angle direction of the conventional STN type liquid crystal display device, FIGS. 11 and 12 are views showing the relation between the refractive index of the birefringence layer and the color changes in accordance with the visual angle direction, FIG. 13 is a view showing the relation between the twist angle of the liquid crystal layer and the $\Delta n_z$ of the birefringence layer.

FIG. 14 is an explanatory view showing the relation of the angles among each parts of the OMI type liquid crystal display device.

DETAILED DESCRIPTION OF THE INVENTION

Figure 1:
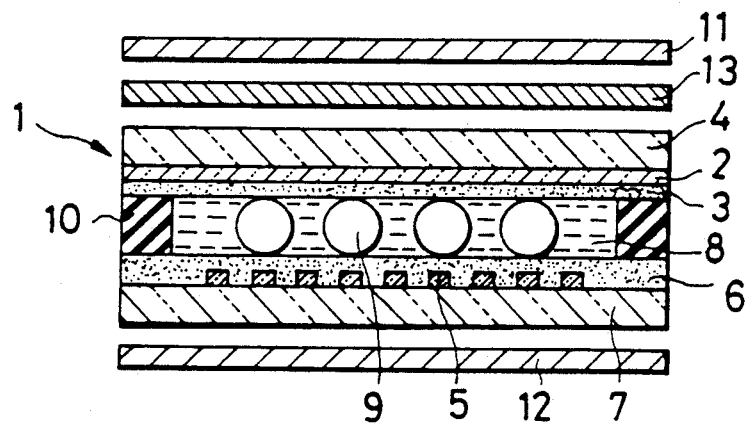
FIGS. 1 through 9 and FIGS. 11 through 14 relate to the liquid crystal display device of the present invention, FIGS. 10 and 15 relate to the conventional liquid crystal display device and FIGS. 16 through 20 relate to the liquid crystal display device according to the present invention and the Comparative Examples.

The present invention relates to a liquid crystal display device which is excellent in a visual angle characteristic, and more particularly relates to a STN type liquid crystal display device, an OMI type liquid crystal display device based on the STN type liquid crystal display device, and an ECB type liquid crystal display device.

Each type of liquid crystal display device of the present invention comprises (1) a liquid crystal cell wherein a liquid crystal layer comprising a liquid crystal composition having positive dielectric anisotropy is sandwiched between substrates having at least one electrode, (2) a pair of polarizers arranged to sandwich the liquid crystal layer therebetween, and (3) a birefringence layer having refractive index anisotropy and transparency provided between the liquid crystal layer and the polarizer on at least one side of the liquid crystal layer, and further, the angle formed between the maximum refractive index direction in the birefringence layer face and the direction of transmission axis or absorption axis of the polarizer adjacent to the birefringence layer is not more than 5°.

The STN type liquid crystal display device of the present invention is structured so that liquid crystal molecules of the liquid crystal layer which is sandwiched between the pair of substrates are oriented substantially in parallel to the surface of the substrate and twisted in a perpendicular direction to a surface of the substrate when no voltage is applied, and the orientation direction of the liquid crystal molecules adjacent to the polarizer is shifted from the transmission axis or absorption axis of the polarizer. When the twist angle ($\alpha$) of the liquid crystal molecules is not less than 180°, the angle ($\delta$) of the direction (A) formed to the orientation direction (C) of liquid crystal molecules adjacent to the birefringence layer is in the range of 0° to +90° provided that the twist direction of the liquid crystal molecules advancing to the birefringence layer in the case of seeing the cell from the birefringence layer side is the positive direction, and when the twisted angle (α) is not more than 180°, the above angle (δ) is in the range of 0° to −90°. The above direction (A) is one of the directions (A) and (B) of the optical axes in the birefringence layer projected to the birefringence layer face and the angle (δ) of direction (A) formed to the direction (C) is smaller than the angle of direction (B) formed to the direction (C) when the direction (A) does not coincide with the direction (B).

In the OMI type liquid crystal display device of the present invention, liquid crystal molecules sandwiched between the pair of substrates are oriented substantially in parallel to the substrate surface and twisted at an angle of not less than 160° in a perpendicular direction to a surface of the substrate when the voltage is not applied, and the product Δn·d of the refractive index anisotropy Δn of the liquid crystal component and the thickness d of the liquid crystal layer at normal temperature is 0.4 to 0.9 μm. And the angle of the transmission axis of polarizer adjacent to the one substrate (a) of the liquid crystal cell formed to the transmission axis of the other polarizer adjacent to the other substrate (b) of the liquid crystal cell is in the range of 60° to 90° provided that the twist direction of liquid crystal molecules from the substrate (b) to the substrate (a) is the positive direction, and the angle formed between the orientation direction of liquid crystal molecules in the center of thickness of liquid crystal layer and the bisector between the transmission axes of a pair of the polarizers is in the range of 30° to 60°.

Next, the liquid crystal display device of each STN type, OMI type and ECB type of the present invention will be explained in more detail.

The STN type liquid crystal display device and the OMI type liquid crystal display device of the present invention have similar basic construction, and the common part of the basic construction will be explained with reference to the embodiment shown in FIGS. 1 and 2.

The liquid crystal cell 1 of the present embodiment has a structure wherein a substrate 4 on which a transparent electrode 2 and an orientation film 3 are formed and a substrate 7 on which a transparent electrode 5 and an orientation film 6 are formed are arranged opposite each other and substantially in parallel to each other, and the liquid crystal is filled between the orientation films 3 and 6 to form a liquid crystal layer 8. The electrodes 2 and 5 on the respective inner surface side of a pair of the substrates 4 and 7 sandwiching the liquid crystal layer 8 therebetween are arranged to form, for example, a dot-matrix or stripes in different direction. Numeral 9 is a capping material and 10 is a sealing material. On the opposing sides of the liquid crystal cell 1, the polarization plates 11 and 12 are provided to become a pair of polarizers. The pair of polarization plates 11 and 12 are arranged to be substantially in parallel to each other and to sandwich the liquid crystal cell 1 therebetween.

Further, a birefringence layer 13 is provided between the polarization plate 11 and the liquid crystal layer 8, namely, in the present embodiment, it is provided between the polarization plate 11 and the substrate 4. Contrary, it is also possible to provide the birefringence layer between the other polarization plate 12 and the substrate 7, or to provide the birefringence layer between the polarization plate 11 and the substrate 4 and between the polarization plate 12 and the substrate 7, respectively.

Figure 2:
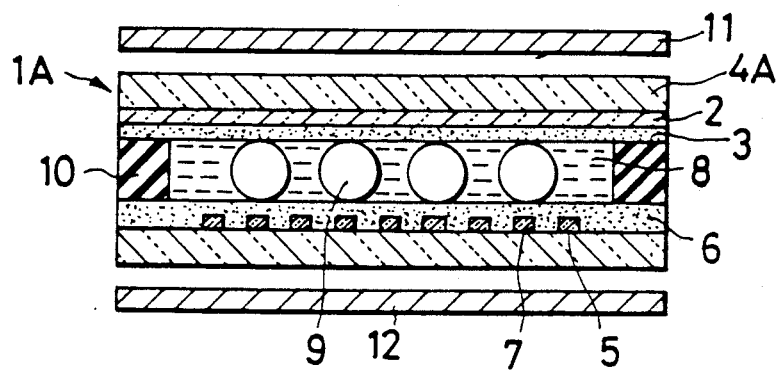

As shown in FIG. 2, in the liquid crystal cell of STN type and OMI type liquid crystal display device of the present invention, it is also possible that a substrate 4A on the one side may be a liquid crystal cell 1A having a structure to serve concurrently for the birefringence layer. In this case, it is possible that the substrate 7 serves concurrently for the birefringence layer or both the substrates serve concurrently for the birefringence layer. Further, when the birefringence layers are arranged on both sides of the liquid crystal cell 1, one of the birefringence layers may be arranged separately from the substrate in accordance with FIG. 1, and the other one may be arranged integrally with the substrate in accordance with FIG. 2.

The details of each element constituting the STN type and OMI type liquid crystal display devices of the present invention are as follows.

That is, as the substrates 4 and 7, the transparent substrate such as glass and plastic film is used. As the orientation films 3 and 6, the well known material obtained by subjecting a film made of high polymer such as polyamide or polyimide to rubbing treatment is used. A material comprising liquid crystal component having positive dielectric anisotropy is used as the liquid crystal constituting the liquid crystal layer 8. As the typical example, the mixed liquid crystal made by mixing the p-type nematic liquid crystal with a chiral nematic liquid crystal or a cholesteric liquid crystal is used.

The above mentioned birefringence layer 13 has refractive index anisotropy and transparency. As the above layer 13, drawing or extruding molded film made of aromatic high polymer such as polyester, polycarbonate, polyallylate, polyetherethylketon, polysulfon and polyethersulfon, polyolefin high polymer such as polyethylene and polypropylene, polyolefin high polymer derivative, vinyl high polymer such as polyvinylidene chloride, polyvinylalcohol, polystyrene and acrylic resin, and cellulose and its derivative such as regenerated cellulose (cellophane), diacetylcellulose and triacetylcellulose is used. Further, as the layer 13, the material obtained by cutting off a crystalline thin plate from mica, calcite and rock crystal along the face parallel to its optical axis is also applicable. In these materials, the high polymer is most preferably used, because the material having a large area can be easily obtained. As mentioned above, the birefringence layer 13 can be formed integrally with or separately from the substrate, and when it is formed integrally with the substrate, it can be formed on the substrate by the deposition. Further, it is also possible to use the film having a birefringence layer as the protection film for the polarization plate in place of using it on the substrate side.

The embodiment of the STN type liquid crystal display device will be explained below in more detail.

The liquid crystal molecules of liquid crystal layer shown in FIGS. 1 and 2 are oriented substantially in parallel to the substrate surface, namely, the molecular structure thereof is oriented substantially in parallel to the substrate surface. Further, it has a twisted structure in the thickness direction.

Here, the STN type liquid crystal display device will be explained with reference to FIG. 8. This figure shows the angle relation regarding the liquid crystal display device in the case of seeing the device from the polarization plate 11 side and also, shows the angle relation when the liquid crystal molecules form the clockwise (right-handed) helical structure from the bottom, namely from the substrate 7 side to the upside.

Figure 8:
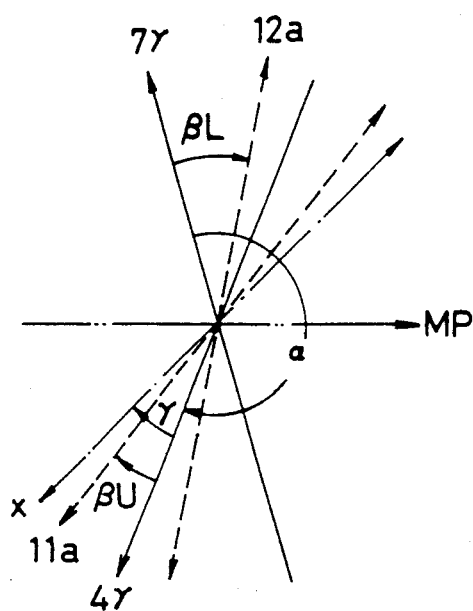

In FIG. 8, the direction which code MP shows is an orientation direction of the liquid crystal molecules in the center of the thickness direction in the liquid crystal layer 8. The angle formed between the transmission axis 12a of polarization plate 12 and the orientation direction of the liquid crystal molecules contacting with the substrate 7 (namely, rubbing direction 7r of orientation film 6) is defined as $\beta L$, and the angle formed between the transmission axis 11a of polarization plate 11 and the orientation direction of the liquid crystal molecules contacting with the substrate 4 (namely, rubbing direction 4r of orientation film 3) is defined as $\beta U$. The angle $\alpha$ is a twist angle of the liquid crystal molecules.

Further, the maximum refractive index direction in the plate face of the birefringence layer 13 (or the substrate 4A having the birefringence layer) is defined as x direction, and the angle of this x direction formed to the above rubbing direction 4r is defined as $\gamma$. In FIG. 8, the twist direction of the liquid crystal advancing from the bottom to the upside in the case of seeing the liquid crystal display device from the birefringence layer side (namely, seeing it from the upside in FIGS. 1 and 2) is defined as the positive direction. When the birefringence layer is arranged under the liquid crystal layer 8 in FIGS. 1 and 2, the twist direction advancing from the upside to the bottom in the case of seeing the device from the bottom can be defined as the positive direction.

Figure 6:
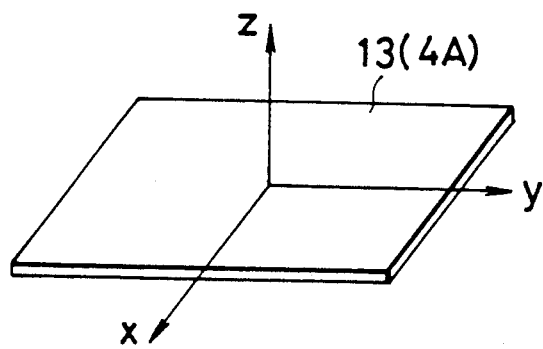

Further, as shown in FIG. 6, the direction orthogonal to the x direction in the plate face of the birefringence layer 13 (4A) is defined as y direction, and the direction orthogonal to the directions x and y, namely, the thickness direction of birefringence layer is defined as z direction, and the refractive indexes in these directions are defined as $n_x$, $n_y$, $n_z$, respectively.

Figure 7:
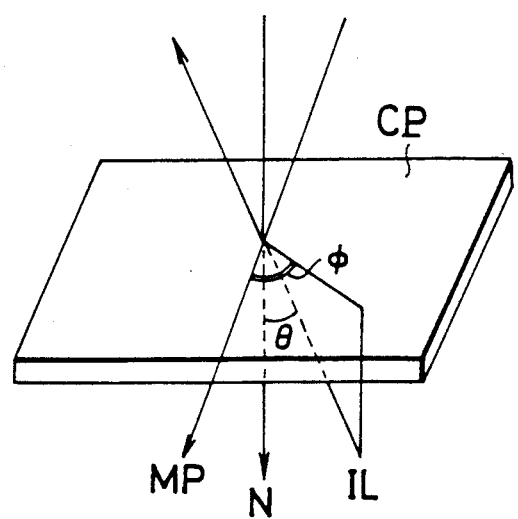

And the visual angle direction is defined as shown in FIG. 7. Namely, the direction crossing the substrate plane orthogonally is defined as N, the angle formed between the direction N and the direction of incident light IL is defined as $\theta$, and the angle formed between the direction of incident light projected to the substrate plane CP and the above direction MP is defined as $\phi$. Therefore, the visual angle direction is determined by $\theta$ and $\phi$.

The x direction is the maximum refractive index direction in the birefringence layer face as mentioned above, and when this direction is shifted from the transmission axis or the absorption axis adjacent to the birefringence layer, the contrast of the displayed image is decreased. The present invention avoids the decrease of contrast of the displayed image by setting the angle formed between the x direction and the transmission axis or absorption axis to be not more than 5°.

Figure 10:
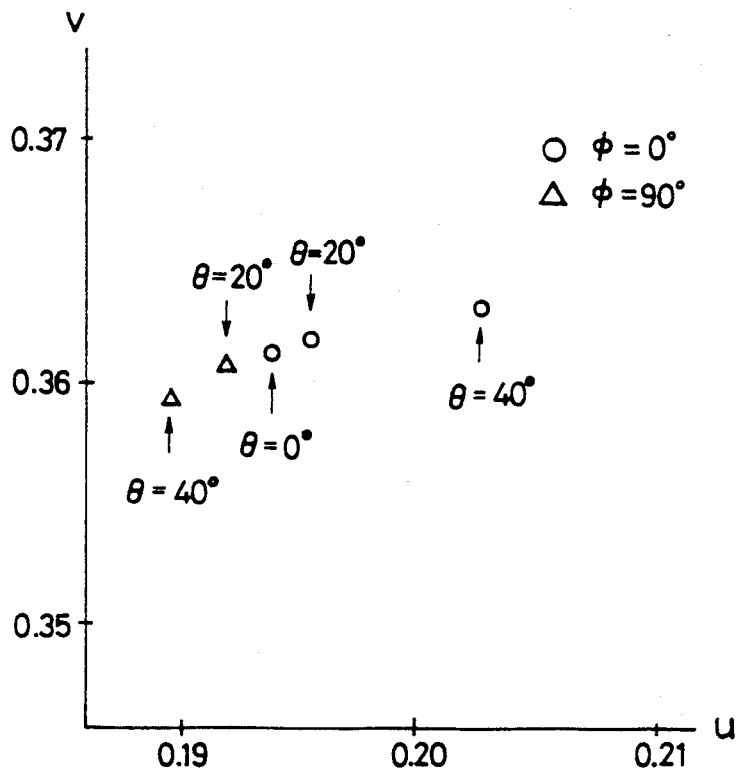

FIG. 10 shows the example of color change in the conventional general STN type liquid crystal display device by utilizing (u,v) chromaticity diagram. The cell parameter characterizing the liquid crystal display is set as $\alpha=220°$, $\beta L=45°$, $\beta U=45°$ and $\Delta n \cdot d=0.86$ $\mu$m. In this case, the liquid crystal cell becomes in a yellow mode which is colored yellow when the voltage is not applied.

As shown in FIG. 10, the color of liquid crystal cell becomes red in accordance with the increase of $\theta$ in the direction of $\phi=0$ (indicated as o), and it becomes blue in accordance with the increase of $\theta$ in the direction of $\phi=90°$ (indicated as $\Delta$). As seen clearly from the figure, the color change dependent on the visual angle of liquid crystal cell can be recognized remarkably in the change of u value on the (u,v) chromaticity diagram.

The color change dependent on the visual angle is estimated by $\Delta u(\theta)$ defined by the following formula:

$$\Delta u(\theta) = u(\theta) - u(0),$$

wherein the $u(\theta)$ is the value of u when the visual angle is $\theta$, and $u(\theta)$ is the value of u when $\theta=0$. As the value of $\Delta u(\theta)$ is larger, the color change dependent on the visual angle is larger, namely, the visual angle characteristic is bad.

The result of the estimation based on the $\Delta u(\theta)$ for the STN type liquid crystal display device having the structure shown in FIGS. 1 and 2 will be explained. Each device has similar cell parameter excepting the difference of the arrangement position of the birefringence layer (whether the birefringence layer is formed integrally with the liquid crystal cell or serves concurrently for the substrate), and the cell parameter is similar to that shown in FIG. 10.

Figure 11:
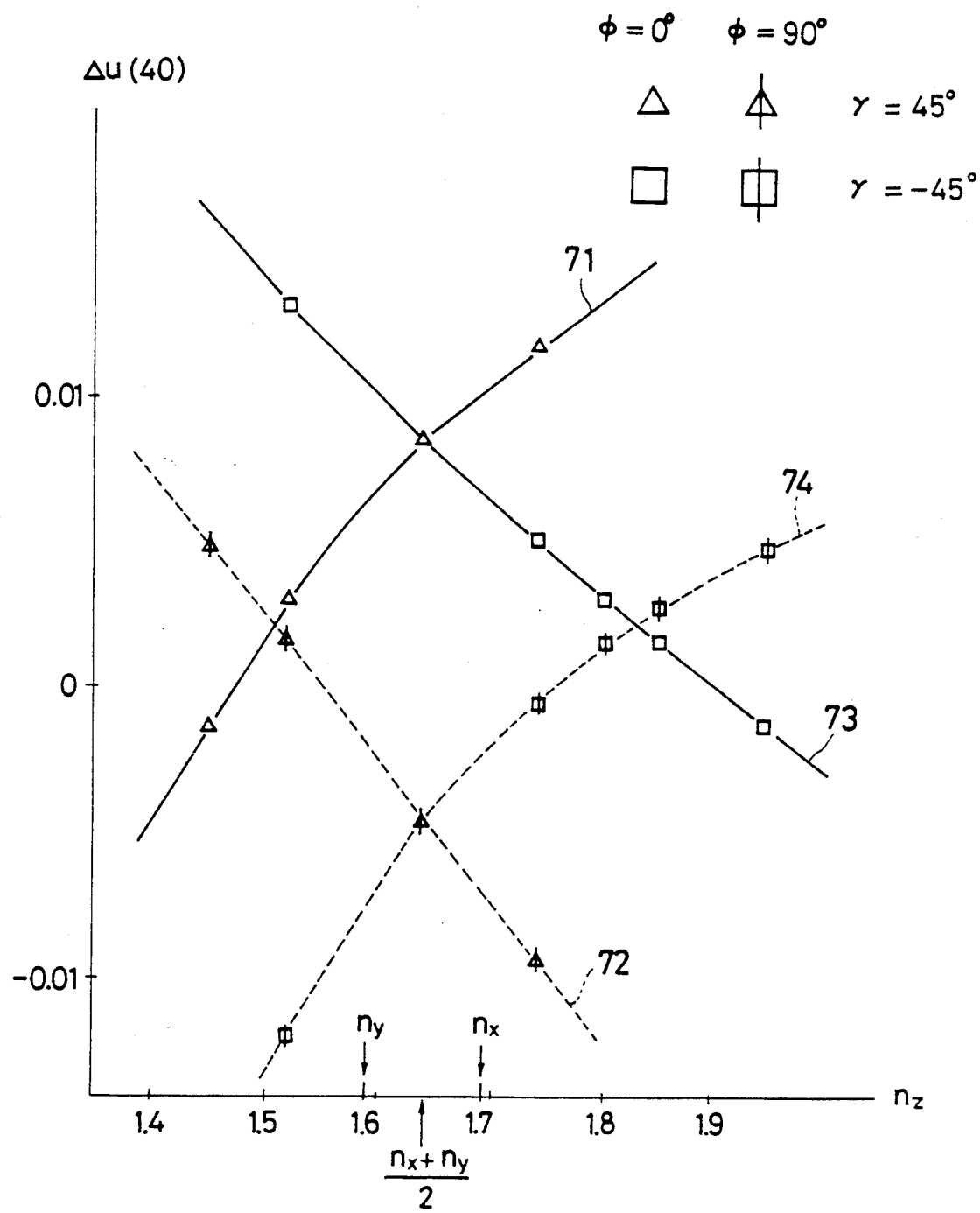

The change of $\Delta u(40)$ (namely, $\Delta u(\theta)$ in the case of $\theta=40°$) when the values of refractive indexes $n_x$ and $n_y$ in the birefringence layer are fixed and the $n_z$ is changed is shown in FIG. 11 (wherein $n_x=1.69$, $n_y=1.59$ and $\Delta n \cdot d=10$ $\mu$m).

As seen clearly from the figure, as $n_z$ becomes larger, the value of $\Delta u(40)$ (curve 71) in the direction of $\phi=0°$ becomes larger, and the value of $\Delta u(40)$ (curve 72) in the direction of $\phi=90°$ becomes smaller, when the angle ($\gamma$) of x direction of birefringence layer formed to the rubbing direction is 45°. Further, when $n_z$ is the same as the average value of $n_x$ and $n_y$ in the above case, the values of $\Delta u(40)$ in the both cases of $\gamma=45°$ and $\gamma=-45°$ are the same with each other and, it does not depend on the presence or absence of the birefringence layer. Therefore, when the birefringence layer is provided between the liquid crystal layer 8 and the polarization plate 11 as shown in FIGS. 1 and 2, the value of $n_z$ should be smaller than the average values of $n_x$ and $n_y$ in the case of $\gamma=45°$ to obtain an improved visual angle characteristic.

Further, as seen clearly from FIG. 11, when the x direction of the birefringence layer is at the angle of $\gamma=-45°$, the value of $\Delta u(40)$ (curve 73) in the direction of $\phi=0°$ becomes smaller and the value of $\Delta u(40)$ (curve 74) in the direction of $\phi=90°$ becomes larger, respectively as $n_z$ becomes larger. Therefore, in the case of $\gamma=-45°$, the value of $n_z$ should be larger than the average value of $n_x$ and $n_y$ to obtain an improved visual angle characteristic.

The explanation as described above can be applied to the case that the x direction of the plate material of birefringence layer and the transmission axis of the polarization plate accord in each other at the angle of 45° to the orientation direction of liquid crystal molecules, and the above explanation can be also applied to the case that the polarization plates 11 and 12 are rotated in the angle of 90° so that the direction of the absorption axis of the polarization plate coincides with the x direction.

Here, the following explation refers to the optical axis of the birefringence layer when the value of $n_z$ is changed while fixing the values of $n_x$ and $n_y$.

When the relation between $n_x$, $n_y$, and $n_z$ is set as $n_x > n_y > n_z$, two optical axes of the birefringence layer exist symmetrically to x axis in xz face, and when they are projected to the birefringence layer face (xy face), its projected direction coincides with the x direction which is the maximum refractive index direction in the birefringence layer face. And the optical axis of the birefringence layer in the case of $n_z = n_y$ coincides with the x axis. In the case of $n_x > n_y > n_z$, two optical axes of birefringence layer exist symmetrically to the x axis in xy face. Particularly, in the case of $n_z = (n_x + n_y)/2$, the optical axes exist in the two directions forming the angle of ±45° to the x axis, and becomes parallel or orthogonal to the orientation direction of liquid crystal molecules adjacent to the birefringence layer in the above case of the liquid crystal display device.

The optical axis of the birefringence layer in the case of $n_z = n_x$ becomes y axis. Further, in the case of $n_z > n_x > n_y$, two optical axes of the birefringence layer exist symmetrically to z axis in yz face, and when they are projected to the birefringence layer face, its direction becomes y direction orthogonal to the maximum refractive index direction in the birefringence layer face.

Further, the STN type liquid crystal display device in the above embodiment in the case of $\gamma = 45°$ will be explained as follows. In the case of $n_z \leq n_y$, the direction of the optical axis of the birefringence layer projected to the birefringence layer face coincides with the maximum refractive index direction in the birefringence layer face, and forms the angle of 45° in the direction positive to the orientation direction of liquid crystal molecules adjacent to the birefringence layer.

Figure 9:
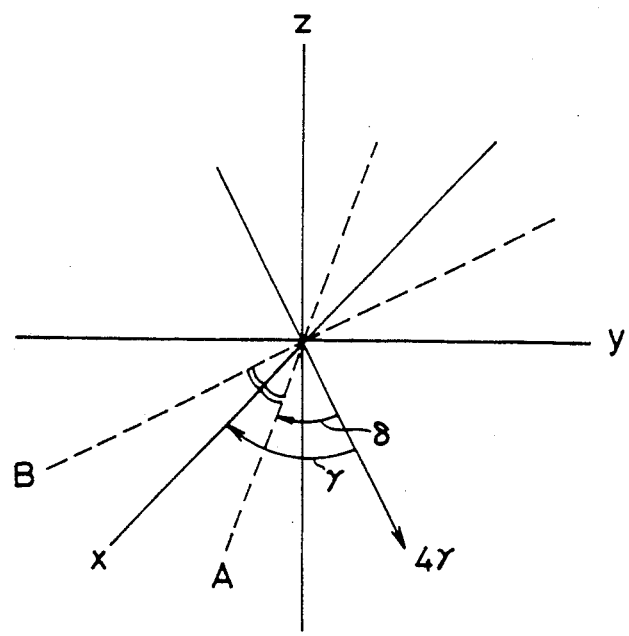

In the case of $n_y < n_z < (n_x + n_y)/2$, as shown in FIG. 9, in the optical axis directions (A) and (B) of the birefringence layer, the angle (δ) of the direction (referred to as direction (A)) formed to the orientation direction (C) of liquid crystal molecules adjacent to the birefringence layer is smaller than the angle of the other direction (referred to as direction (B)) formed to the orientation direction (C) and forms an angle of 0° to 45° in the direction positive to the orientation direction (C). And in the case of $n_z = (n_x + n_y)/2$, the direction (A) coincides with the orientation direction (C). In the case of $n_x > n_z > (n_x + n_y)/2$, the direction (A) forms an angle of 0° to 45° in the direction negative to the orientation direction (C). In the case of $n_x \leq n_z$, the direction of the optical axis of the birefringence layer projected to the birefringence layer face coincides with the direction orthogonal to the maximum refractive index direction, and forms the angle of 45° in the direction negative to the orientation direction (C). Namely, in the case of $\gamma = 45°$, the direction (A) is required to form an angle of 0° to 45° in the direction positive to the orientation direction (C) in order to render the value of $n_z$ smaller than the average value of $n_x$ and $n_y$.

Next, the case when $\gamma = -45°$ will be explained.

In the case of $n_z \leq n_y$, the direction of the optical axis of the birefringence layer projected to the birefringence layer face coincides with the maximum refractive index direction in the birefringence layer face, and forms the angle of 45° in the direction negative to the orientation direction (C) of liquid crystal molecules. In the case of $n_y < n_z < (n_x + n_y)/2$, the direction (A) forms an angle of 0° to 45° in the direction negative to the orientation direction (C), and in the case of $n_z = (n_x + n_y)/2$, the direction (A) coincides with the orientation direction (C). In the case of $n_x > n_z > (n_x + n_y)/2$, the direction (A) forms an angle of 0°–45° in the direction positive to the orientation direction (C). In the case of $n_x \leq n_z$, the direction of the optical axis projected to the birefringence layer face is orthogonal to the maximum refractive index direction in the birefringence layer face, and forms the angle of 45° in the direction positive to the orientation direction (C). Therefore, in the case of $\gamma = 45°$, the direction (A) is required to form an angle of 0° to 45° in the direction positive to the orientation direction (C) in order to render the value of $n_z$ larger than the average value of $n_x$ and $n_y$.

As can be known from the above explanation, in the STN type liquid crystal display device, it is required that the direction (A) forms an angle (δ) of 0° to 45° in a direction positive to the orientation direction (C) of liquid crystal molecules adjacent to the birefringence layer, wherein the direction (A) is one of the directions (A) and (B) of the optical axes in the above birefringence layer projected to the birefringence layer face, and the angle (δ) of the direction (A) formed to the direction (C) is smaller than the angle of the direction (B) formed to the direction (C) when the direction (A) does not coincide with the direction (B).

The above explanation is related to the yellow mode, then, and the following explanation will be related to the blue mode.

Figure 12:
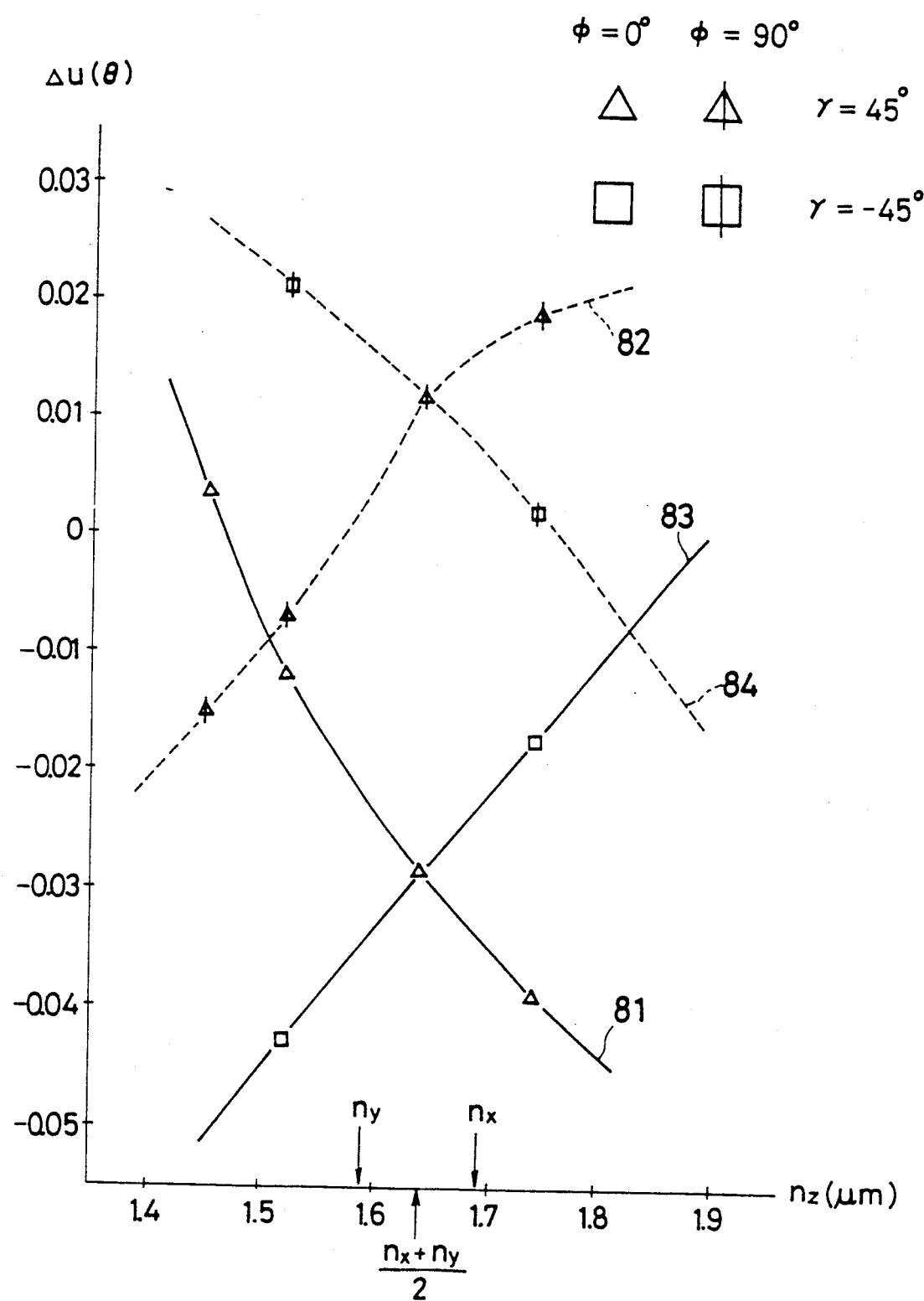

When the cell parameter is set as $\alpha = 220°$, $\beta L = 45°$, $\beta U = -45°$ and $\Delta n \cdot d = 0.86$ μm, the liquid crystal cell becomes blue when the voltage is not applied, and becomes yellow when the voltage is applied. When the STN type liquid crystal display device of the blue mode is structured as shown in FIGS. 1 and 2, the refractive indexes $n_x$ and $n_y$ in the birefringence layer 13 (4A) are fixed and $n_z$ is changed, the change of $\Delta u(40)$ is shown in FIG. 12. The values of $n_x$, $n_y$ and $\Delta n \cdot d$ are the same as those in the birefringence layer used in the yellow mode.

As seen clearly from the figure, in the case of $\gamma = 45°$, the value of $\Delta u(40)$ in the direction of $\phi = 0°$ becomes smaller (curve 81) and the value of $\Delta u(40)$ in the direction of $\phi = 90°$ becomes larger (curve 82), respectively as $n_z$ becomes larger.

When $n_z$ is equal to the average value of $n_x$ and $n_y$, the values of $\Delta u(40)$ in the directions of $\gamma = 45°$ and $\gamma = -45°$ are the same with each other, and it does not depend on the presence or absence of the birefringence layer. Therefore, in the case of $\gamma = 45°$, the improved visual angle characteristic can be obtained by setting the value of $n_z$ to be smaller than the average value of $n_x$ and $n_y$.

As seen clearly from the curves 83 and 84 in FIG. 12, in the case of $\gamma = -45°$, the value of $\Delta u(40)$ in the direction of $\phi = 0°$ becomes larger and the value of $\Delta u(40)$ in the direction of $\phi = 90°$ becomes smaller, respectively as $n_z$ becomes larger. Therefore, in the case of $\gamma = -45°$, the improved visual angle characteristic can be obtained by setting the value of $n_z$ to be larger than the average value of $n_x$ and $n_y$.

Similarly to the case of the yellow mode, the above explanation can be applied to the case of rotating the polarization plates 11 and 12 at the angle of 90° so that the absorption axis of polarization plate coincides with the x direction.

Therefore, the condition for decreasing the color changes dependent on the visual angle of the STN type liquid crystal display device of blue mode is the same as in the yellow mode.

The above relation can be realized when the value of γ is out of the range of ±45°, and in order to decrease the color change dependent on the visual angle it is required that the direction (A) forms an angle (δ) of 0° to 90° in the direction positive to the orientation direction (C) of liquid crystal molecules adjacent to the birefringence layer, wherein the direction (A) is one of the directions (A) and (B) of the optical axes in the above birefringence layer projected to the birefringence layer face, and the angle of the direction (A) formed to the direction (C) is smaller than the angle of the direction (B) formed to the direction (C) when the direction (A) does not coincide with the direction (B).

Next, the change of visual angle characteristic when the twist angle α is changed will be explained.

In FIG. 11, $n_z$ when $\Delta u(40)$ in the direction of $\phi=0°$ coincides with $\Delta u(40)$ in the direction of $\phi=90°$ is defined as $n_c$ and the difference between $n_c$ and the average value of $n_x$ and $n_y$ is defined as $\Delta n_z$.

Namely, $$\Delta n_z = n_c - \{(n_x+n_y)/2\}.$$

In FIG. 11, $\Delta n_z$ is negative in the case of $\gamma=45°$, and is positive in the case of $\gamma=-45°$.

Figure 13:
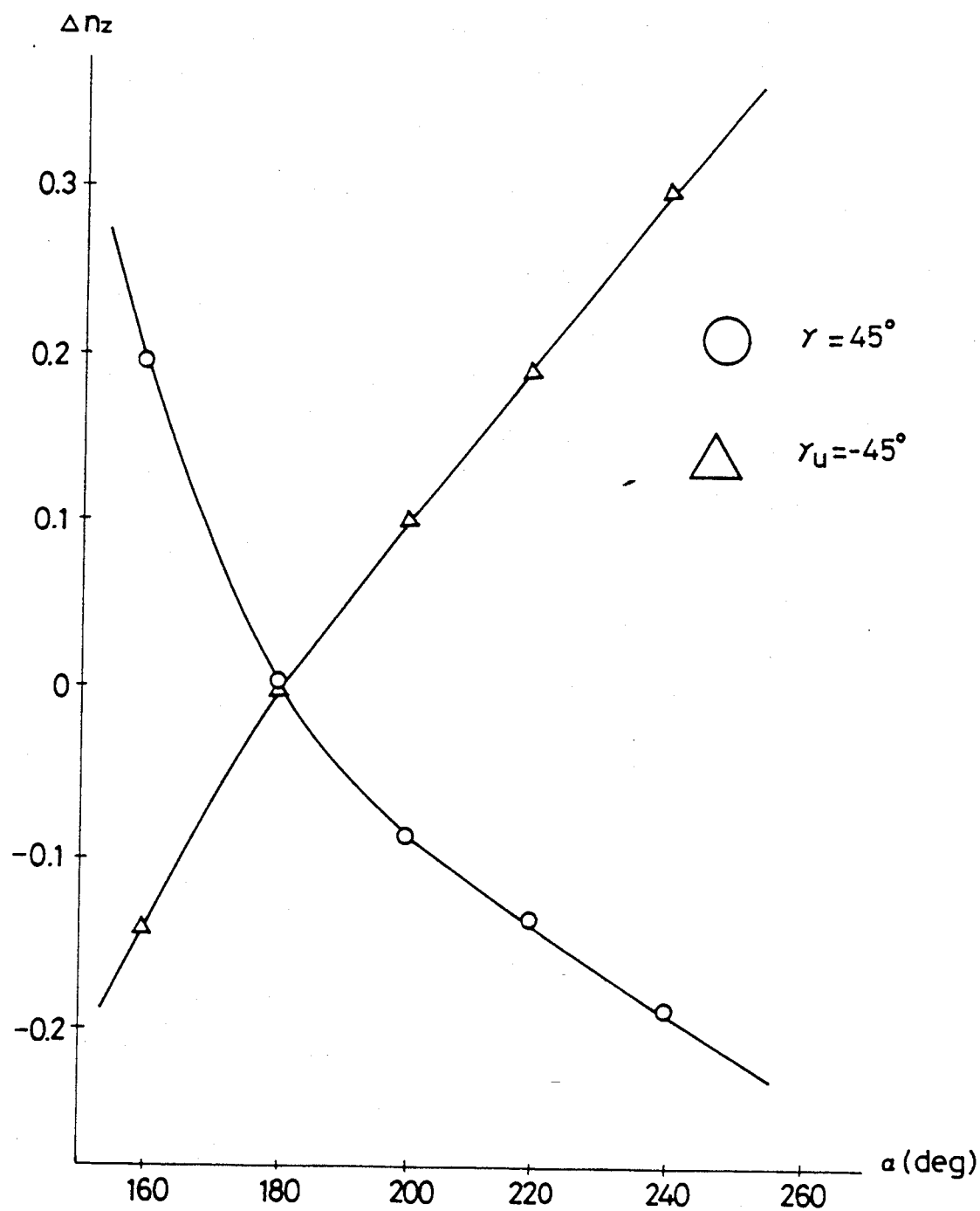

FIG. 13 shows the change of $\Delta n_z$ when the twist angle α is changed. Each angle between the transmission axis of the polarization plate and the orientation direction of liquid crystal molecules adjacent to the substrate is set as $\beta L = \beta U = 45°$, and the value of $\Delta n \cdot d$ is shown in Table 1.

TABLE 1

| Twist angle (°) | 160 | 180 | 200 | 220 | 240 |
|---|---|---|---|---|---|
| Δn · d (μm) | 0.98 | 0.95 | 0.91 | 0.86 | 0.81 |

As shown in FIG. 13, in the case of $\gamma=45°$, $\Delta n_z$ is negative when α is not less than 180°, and $\Delta n_z$ is positive when α is not more than 180°. In the case of $\gamma=-45°$, $\Delta n_z$ is positive when α is not less than 180°, and $\Delta n_z$ is negative when α is not more than 180°. Therefore, the condition for reducing the color change dependent on the visual angle is different between the cases of not less than 180° and not more than 180° in twist angle. The relation between the optical axis of the birefringence layer and the orientation direction of liquid crystal molecules for decreasing the color change dependent on the visual angle when the twist angle is not less than 180° becomes contrary to the relation when the twist angle is not more than 180°.

As a result, in the STN type liquid crystal display device, in order to decrease the color change dependent on the visual angle by providing the birefringence layer between the liquid crystal layer 8 and the polarization plate 11 as shown in FIGS. 1 and 2, it is required to satisfy the following conditions.

Provided that the twist direction of the liquid crystal molecules advancing to the front side (namely, to the birefringence layer) in the case of seeing the device from the birefringence layer side is the positive direction, (1) When the twist angle is not less than 180°, the direction (A) forms an angle (δ) of 0° to +90° to the orientation direction (C) of liquid crystal molecules adjacent to the birefringence layer, wherein the direction (A) is one of the directions (A) and (B) of the optical axes in the birefringence layer projected to the birefringence layer face, and the angle (δ) of the direction (A) formed to the direction (C) is smaller than the angle of the direction (B) formed to the direction (C) when the direction (A) does not coincide with the direction (B).

(2) When the twist angle is not more than 180°, the direction (A) forms an angle (δ) of 0° to −90° to the orientation direction (C) of liquid crystal molecules adjacent to the birefringence layer, wherein the direction (A) is one of the directions (A) and (B) of the optical axes in the birefringence layer projected to the birefringence layer face, and the angle (δ) of the direction (A) formed to the direction (C) is smaller than the angle of the direction (B) formed to the direction (C) when the direction (A) does not coincide with the direction (B).

The above explanation refers to the case that the birefringence layer is provided between the liquid crystal layer 8 and the polarization plate 11. When the birefringence layer is provided between the liquid crystal layer 8 and the polarization plate 12, the above condition (1) or (2) is applicable for decreasing the color change dependent on the visual angle provided that the angle formed between the x direction and the rubbing direction of orientation film 6 in the substrate is γ. Further, when the birefringence layer is provided between the liquid crystal layer 8 and each of the polarization plates 11 and 12, it is required that at least one of the two birefringence layers satisfies the above condition (1) or (2).

As described above, by the present invention, the new STN type liquid crystal display device can be supplied. Since this STN type liquid crystal display device has the structure as described above, the color change dependent on the visual angle is decreased and as a result, the visual angle characteristic is improved and high contrast images can be displayed. Therefore, the display characteristic can be improved so as to display the excellent images in quality.

Next, the embodiment of the OMI type liquid crystal display device will be explained in more detail.

Figure 14:
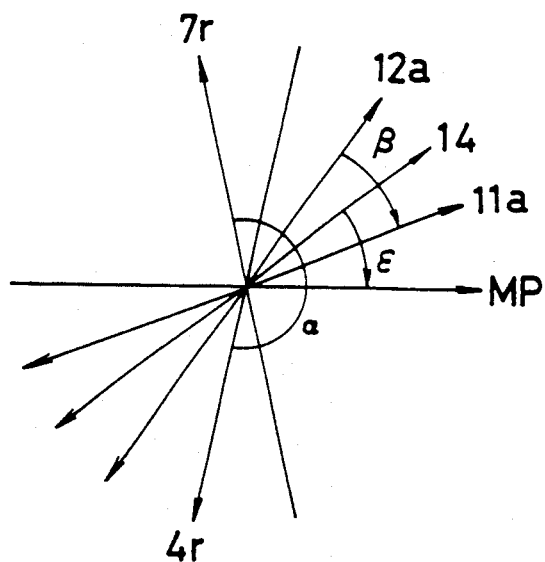

The basic structure of the OMI type liquid crystal display device was already explained with reference to FIGS. 1 and 2. In FIGS. 1 and 2, the liquid crystal molecules of the liquid crystal layer 8 are arranged to be substantially in parallel to the surface of substrates 4 and 7, namely, the molecular structure thereof is oriented to be substantially in parallel to the substrate surface and to have a twisted structure in a thickness direction. This point will be explained in more detail with reference to FIG. 14. FIG. 14 shows the angle relation regarding the OMI type liquid crystal display device in the case of seeing the device from the upper polarization plate 11 side. It shows the case in which the liquid crystal molecules are provided with the clockwise (right - handed) spiral structure from the bottom, namely, from the substrate 7 side to the upside. In the figure, numeral 4r shows an orientation direction of the liquid crystal molecules on the upper substrate 4, 7r shows an orientation direction of the liquid crystal molecules on the lower substrate 7, MP shows an orientation direction of the liquid crystal molecules in the center of thickness of the liquid crystal layer 8, 11a shows a transmission axis of the upper polarization plate 11, 12a shows a transmission axis of the lower polarization plate 12, and 14 shows a bisector between the transmission axes of upper and lower polarization plates 11 and 12. Further, the twist direction of the liquid crystal molecules from the lower substrate 7 to the upper substrate 4 is defined as the positive direction, the angle of the transmission axis 11a of the upper polarization plate 11 formed to the transmission axis 12a of the lower polarization plate 12 is defined as $\beta$, the angle of the direction MP of the liquid crystal molecules in the center of thickness of the liquid crystal layer 8 formed to the bisector 14 is defined as $\epsilon$, and the twist angle of the liquid crystal layer 8 is defined as $\alpha$.

If the twist angle $\alpha$ of the liquid crystal layer 8 is small, the steepness of the voltage-transmission factor characteristic nearby the threshold is decreased thereby causing the decrease of contrast at time-division drive, therefore, the twist angle $\alpha$ is required to be not less than 160°. Further, it is required to limit the angles $\beta$, $\epsilon$, and $\Delta n \cdot d$ relating to the polarization plates 11 and 12 as follows:

$$60° \leq \beta \leq 90°$$

$$30° \leq |\epsilon| \leq 60°$$

$$0.4 \ \mu m \leq \Delta n \cdot d \leq 0.9 \ \mu m$$

Herein, the $\Delta n$ and d are respectively the refractive index anisotropy of the liquid crystal component and the thickness of liquid crystal layer at normal temperature.

As shown in FIG. 6, the maximum refractive index direction in the layer face of the birefringence layer 13 (or the substrate 4A having the birefringence layer) is defined as x direction, the direction crossing orthogonally the x direction in the plate face of the birefringence layer 13 is defined as y direction, the direction crossing orthogonally the directions x and y, namely the thickness direction of the birefringence layer 13 is defined as z direction, and the refractive indexes in each directions are defined as $n_x$, $n_y$, and $n_z$. And the visual angle direction is defined as shown in FIG. 7. Namely, the direction crossing orthogonally the substrate plane CP is defined as N, the angle formed between the N direction and the direction of incident light IL is defined as $\theta$, and the angle formed between the projection of incident light to the substrate plane CP and the direction MP is defined as $\phi$. Therefore, the visual angle direction is determined with $\theta$ and $\phi$.

In the present embodiment of the OMI type liquid crystal display device, the color change dependent on the visual angle in the liquid crystal cell 1 can be reduced by providing the birefringence layer 13 between the liquid crystal layer 8 and the polarization plate 11 as described later. However, if the maximum refractive index direction x is shifted from the transmission axis (or absorption axis) of the polarization plate 11, the contrast of display is decreased. Therefore, it is necessary that the angle formed between the maximum refractive index direction x of the birefringence layer 13 and the transmission axis (or absorption axis) is set to be not more than 5°.

Figure 15:
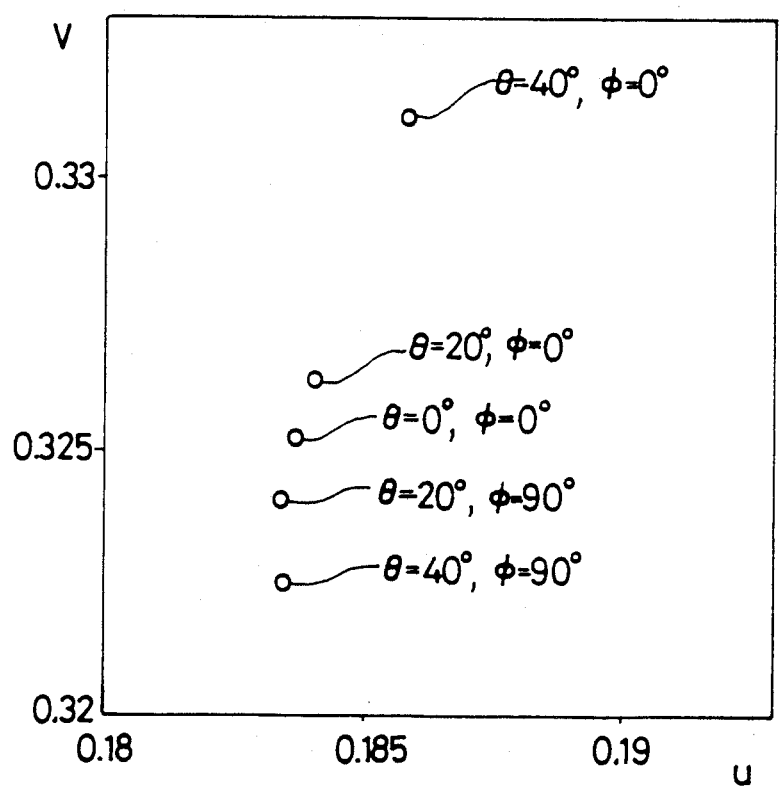
FIG. 15 is a characteristic view showing the color changes in accordance with the visual angle direction of the conventional OMI type liquid crystal display device.

FIG. 15 is a (u,v) chromaticity diagram showing an example of measuring the color change dependent on the visual angle of the conventional OMI type liquid crystal display device. The cell parameter of this liquid crystal display device is set as $\alpha = 240°$, $\beta = 80°$, $\gamma = 45°$, and $\Delta n \cdot d = 0.67 \ \mu m$. As seen from the figure, in the conventional OMI type liquid crystal display device, the displayed color is changed in accordance with the direction of visual angle. The color difference from the displayed color on the front ($\theta = 0°$) is estimated by the $\Delta Euv(\theta)$ defined by the following formula:

$$\Delta Euv(\theta) = [(u(\theta) - u(O))^2 + (v(\theta) - v(O))^2]^{\frac{1}{2}}$$

Here, $(u(\theta), v(\theta))$ are the (u,v) chromaticity coordinates when the visual angle is $\theta$, and $(u(O), v(O))$ are the (u,v) chromaticity coordinates when $\theta = 0°$. As the $\Delta Euv(\theta)$ is larger, the color change dependent on the visual angle becomes larger.

Figure 16:
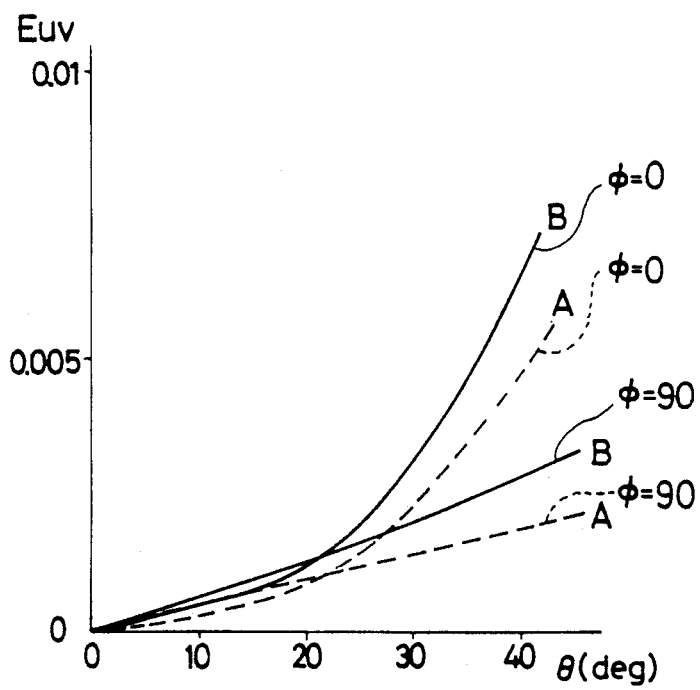
FIG. 16 is a view showing the comparison of color changes in accordance with the changes of visual angle, direction between the OMI type liquid crystal display device of the present invention and the Comparative Example without birefringence layer.

Then, the result of estimating the OMI type liquid crystal display device having the structure of the present embodiments by measuring the $\Delta Euv(\theta)$ as shown in FIGS. 1 and 2 will be explained as follows. Each OMI type liquid crystal display device has the same cell parameter except the difference in arrangement of the birefringence layer (whether it is separated from the liquid crystal cell 1 as in FIG. 1 or serves for the substrate 4A concurrently as in FIG. 2), further, the parameter is the same as that of the OMI type liquid crystal display device used in FIG. 15. Under such a condition, the $\theta$ dependency of $\Delta Euv(\theta)$ in the two cases of $\phi = 0°$ and 90° is shown in FIG. 16, referring to both the case where the x direction of the birefringence layer 13 (including the substrate 4A having a birefringence layer) is arranged to coincide with the transmission axis (or absorption axis) of the polarization plate 11, and the case where the birefringence layer is not so arranged. In FIG. 16, curve A shows the case where the birefringence layer is arranged and the curve B shows the case where the birefringence layer is not arranged. Here, the refractive index of the birefringence layer 13 is set as $n_x = 1.69$, $n_y = 1.59$, $n_z = 1.5207$ and $\Delta n \cdot d = 10 \ \mu m$. In FIG. 16, it can be known that the device having the birefringence layer shows less color change than the device without the birefringence layer. And, the decrease of contrast of display can be prevented by setting the angle formed between the maximum refractive index direction x of the birefringence layer 13 and the transmission axis (or absorption axis) of the polarization plate 11 to be not more than 5°.

As described above, in the OMI type liquid crystal display device based on the STN type liquid crystal display device, the steepness of voltage-transmission factor characteristic nearby the threshold and the contrast of display at time-division drive can be kept by setting the twist angle of the liquid crystal molecules, the angle of transmission axis, etc. relating to a pair of the polarizers and the value of $\Delta n \cdot d$ in certain values as described above. By the presence of birefringence layer the color change dependent on the visual angle is decreased. Then the decrease of the display contrast can be prevented by setting the angle formed between the maximum refractive index direction in the birefringence layer face and the transmission axis or absorption axis of the polarizer adjacent to the birefringence layer to be not more than 5°. Therefore, the obtained display device is less in color change dependent on the visual angle, excellent in visual angle characteristic and high in contrast of display.

Next, the ECB type liquid crystal display device of the present invention will be explained. The materials for the structural component, namely, the substrate, orientation film and the material of birefringence layer used for the ECB type liquid crystal device may be the same as those used in the STN type liquid crystal display device and the OMI type liquid crystal display device of the present invention.

The ECB type liquid crystal display device of the present invention comprises (1) a liquid crystal cell wherein a liquid crystal layer comprising a liquid crystal composition having positive dielectric anisotropy is provided so that the liquid crystal molecules of the liquid crystal layer are homogeneously oriented between a pair of substrates having at least one electrode, (2) a pair of polarizers arranged to sandwich the liquid crystal layer therebetween and (3) a birefringence layer arranged between the liquid crystal layer and the polarizer on at least one side of the liquid crystal layer, wherein the angle formed between the maximum refractive index direction in the birefringence layer face and the transmission axis or the absorption axis of the polarizer adjacent to the birefringence layer is not more than 5°.

In the present invention, the visual angle dependency of the ECB type liquid crystal display device is reduced by arranging the birefringence layer to set the angle formed between the maximum refractive index direction in the birefringence layer face and the transmission axis or the absorption axis of the polarizer to be not more than 5°. If the angle becomes larger than 5°, it causes the decrease of the display contrast or the change of display color, therefore, it is required to limit the angle to be not more than 5°.

The birefringence layer can be formed, for example, of the polymer layer arranged on at least one side between the liquid crystal layer and each of the polarizers. It is also possible to use at least one of the substrates invested with birefringence property while satisfying the above relation. Thereby the visual angle dependency of display color can be reduced without an additional manufacturing step and an increase of the cell thickness. Further, it is possible to invest at least one of the pair of polarizers with the birefringence property. In concrete, for example, the such polarizer may be obtained by structuring the polarizer with two substrates for the polarizer, sandwiching a dicroic polarization film between the substrates and further, investing the substrate for the polarizer on the liquid crystal layer side with the birefringence property. By the process mentioned above, the visual angle dependency of the display color can be reduced without an additional manufacturing step and an increase of the cell thickness.

Next, the ECB type liquid crystal display device of the present invention will be explained in detail with reference to the drawings.

Figure 3:
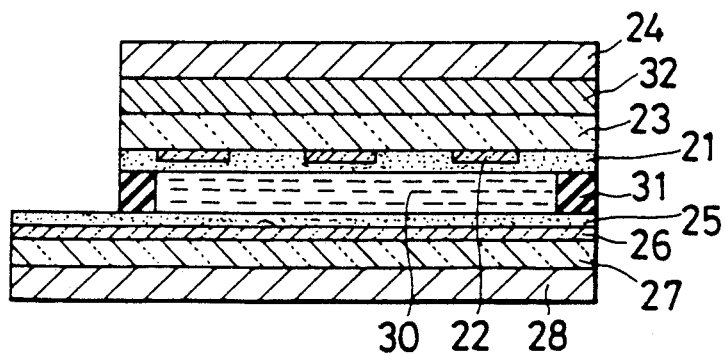

FIG. 3 is a cross sectional view showing an embodiment of the ECB type liquid crystal display device of the present invention. A liquid crystal layer 30 is sandwiched between upper and lower substrates 23 and 27 on which transparent electrodes 22 and 26 and orientation films 21 and 25 are formed, and the liquid crystal layer is intercepted from the outside by a sealing material 31 to thereby form the liquid crystal cell. The liquid crystal molecules of the liquid crystal layer 30 are arranged substantially in parallel to each surface of substrates 23 and 27 by the orientation films 21 and 25 and are homogeneously oriented between the upper and lower substrates 23 and 27. Further, a gap material can be mixed into the liquid crystal layer 30 or the sealing material 31 to keep the thickness of the liquid crystal layer 30 constantly in accordance with the necessity.

In this embodiment, the polarizers 24 and 28 are arranged on the most outer side of the liquid crystal cell, and the birefringence layer 32 is arranged between the upper polarizer 24 and the upper substrate 23 so as to satisfy the above relation.

Here, the definition of angle is shown in FIG. 7 for explaining the function and effect of the liquid crystal layer 32. Namely, the angle formed between the direction N vertical to the liquid crystal cell plane CP and the incident light IL is defined as $\theta$, the orientation direction of the liquid crystal molecules is defined as MP, and the angle formed between the incident light direction projected to the substrate plane and the MP direction is defined as $\phi$. Further, the maximum refractive index in the birefringence layer face is defined as $n_x$, the minimum refractive index therein is defined as $n_y$, and the refractive index in the thickness direction is defined as $n_z$.

Figure 17:
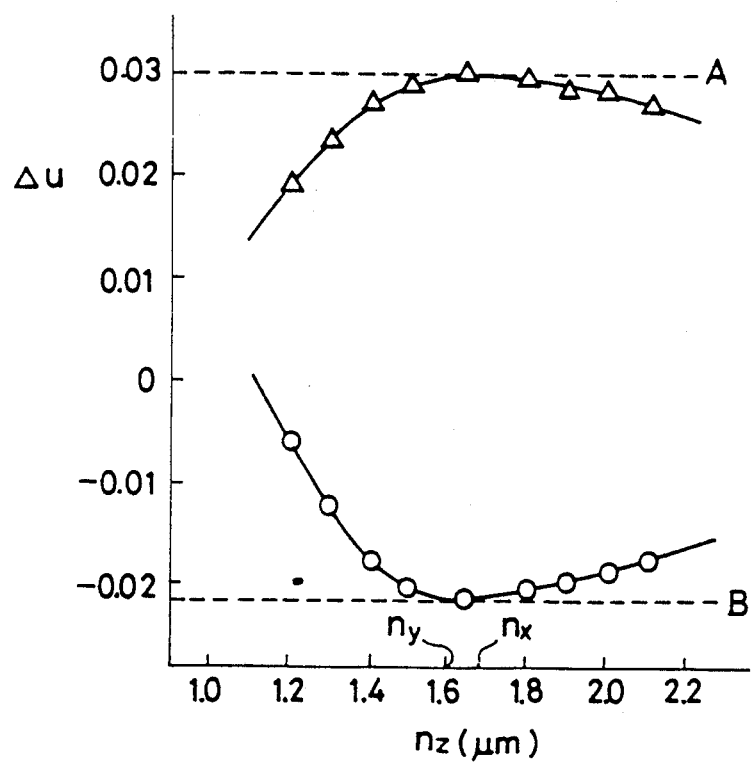
FIG. 17 is a view showing the comparison of the color change $\Delta u$ in accordance with the change of $n_z$ of the birefringence layer between the ECB type liquid crystal display device of the present invention and the Comparative Example without birefringence layer.

The difference between the value of u of chromaticity coordinates (u,v) in the case of seeing the liquid crystal cell from the front ($\theta=0°$) and the value of u in the case of seeing it diagonally ($\theta=40°$) is defined as $\Delta u$, and the $n_z$ dependency of $\Delta u$ in the case of fixing $n_x$ and $n_y$ and changing $n_z$ is shown in FIG. 17. In the figure, the circle mark (o) shows the case of $\phi=0°$ and the triangle mark ($\Delta$) shows the case of $\phi=90°$. Further, the parameter of the liquid crystal cell and the values of $n_x$ and $n_y$ are shown in Table 2.

TABLE 2

| | |
|---|---|
| The product $\Delta n \cdot d$ of birefringence anisotropy $\Delta n$ of liquid crystal molecules and thickness d of liquid crystal layer | 0.55 ($\mu$m) |
| Angle between both transmission axes of upper and lower polarizers | 0° |
| Angle formed between orientation direction of liquid crystal molecules and transmission axis of polarizer | 45° |
| Maximum refractive index $n_x$ in birefringence layer face | 1.69 |
| Minimum refractive index $n_y$ in birefringence layer face | 1.59 |

In FIG. 17, A and B show $\Delta u$ respectively in $\phi=90°$ and $\phi=0°$, without the birefringence layer 32, and it can be known that when the birefringence layer 32 exists, $\Delta u$ becomes smaller and the color change dependent on visual angle is decreased.

Figure 4:
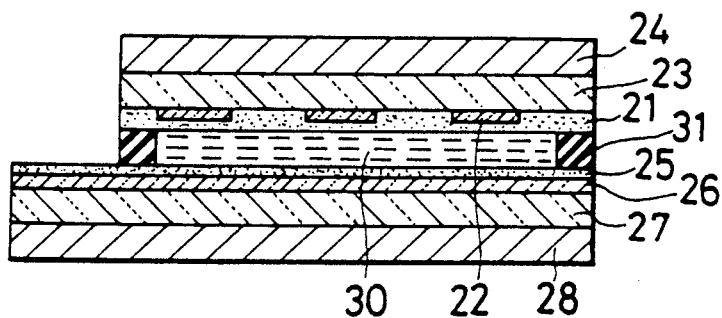
Figure 5:
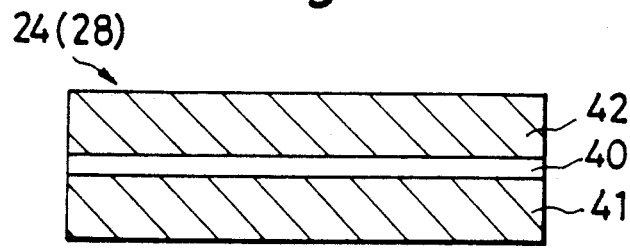

FIG. 4 is a cross sectional view showing another embodiment of the ECB type liquid crystal display device of the present invention. In this figure, the same components as in FIG. 3 are provided with the same numbers. This device looks like the conventional liquid crystal display device so far as shown in FIG. 4, but each structure of the polarizers 24 and 28 is different from the conventional one. Namely, as shown in FIG. 5, the polarizers 24 and 28 have a structure that a dichroic polarization film 40 is sandwiched between both of substrates 41 and 42 for the polarizer. And by using a polymer layer having similar birefringence property for the one substrate on the liquid crystal layer 30 side in these substrates 41 and 42, the same effect as mentioned above can be obtained.

Further, in the embodiment of FIG. 4, when the polarizers 24 and 28 are the same as those used in the device in FIG. 3, and the polymer layer having similar birefringence property as mentioned above is used for at least one of the substrates 23 and 27 used in the liquid crystal cell, the same effect as mentioned above can be obtained.

As described in detail, in the ECB type liquid crystal display device of the present invention having the liquid crystal layer homogeneously oriented between the substrates, since the birefringence layer is arranged between the liquid crystal layer and the polarizer, the visual angle dependency of displayed color can be remarkably improved and the liquid crystal display device excellent in display quality can be realized.

A concrete example will now be explained below. However, the present invention is not limited to the liquid crystal display device described in the Examples.

EXAMPLE 1

The substrates 4 and 7 were obtained by forming the striped transparent ITO (Indium Tin Oxide) electrodes on a glass plate, forming an orientation film of polyamide on the transparent electrodes and subjecting the thus formed film to rubbing treatment. Then, a liquid crystal obtained by mixing nematic liquid crystal with chiral nematic liquid crystal was filled between the both substrates, thus the liquid crystal cell 1 is obtained. On both sides of the liquid crystal cell, the polarization plates 11 and 12 were arranged to obtain the STN type liquid crystal display device. The parameter was set as $\alpha=200°$, $\beta L=\beta U=45°$, $\Delta n \cdot d=0.91$ μm.

Figure 18:
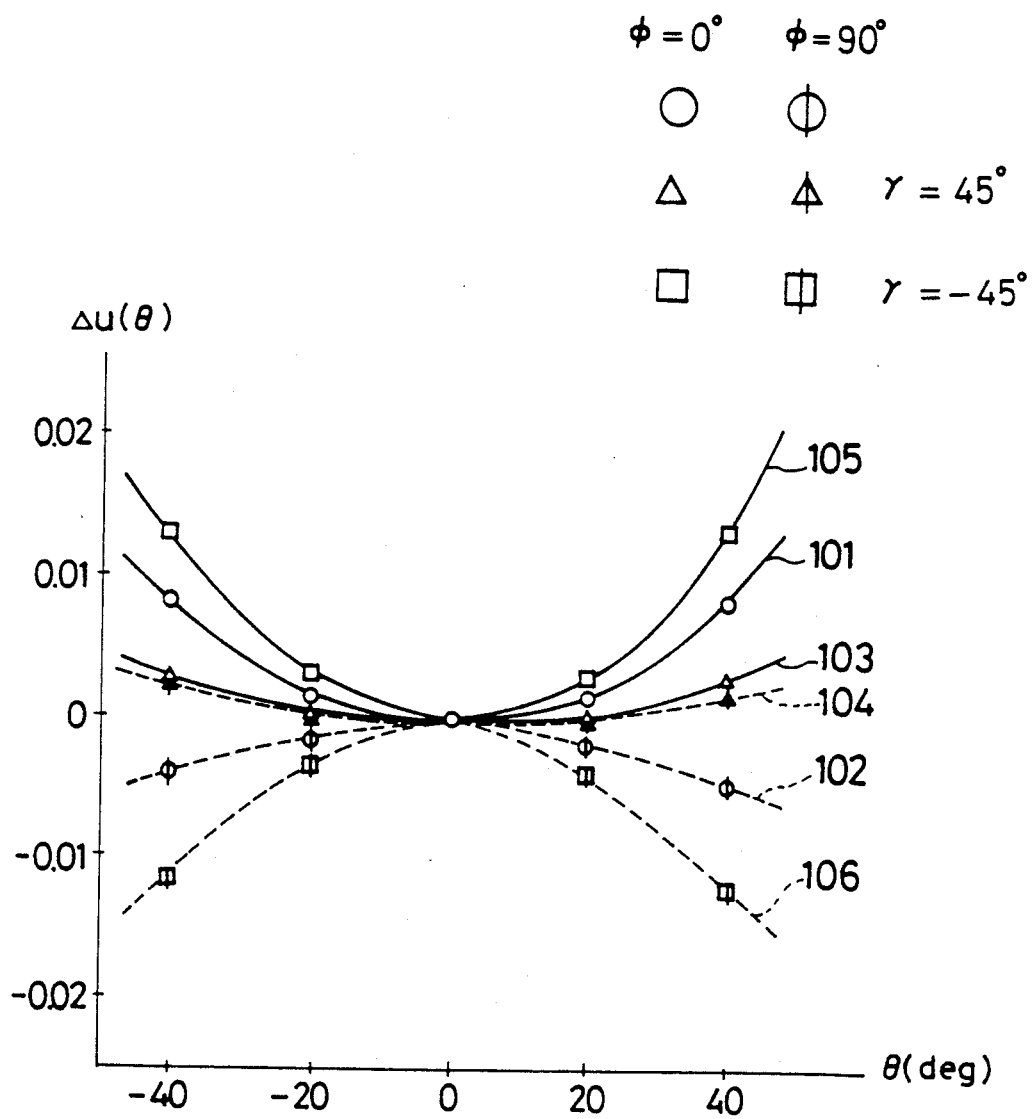
FIGS. 18 through 20 are views showing the comparison of color changes in accordance with the changes of visual angle direction between the STN type liquid crystal display device of Examples of the present invention and the Comparative Examples.

The chromaticity coordinates (u,v) was calculated by measuring the spectra in various visual angle directions in the STN type liquid crystal display device. The curve 101 in FIG. 18 shows the change of $\Delta u(\theta)$ in the direction of $\phi=0°$, and 102 shows the change in the direction of $\phi=90°$, respectively when the birefringence layer was not arranged.

Next, the uniaxial drawing PET (polyethylene terephthalate) was provided between the liquid crystal cell 1 and the polarization plate 11 as the birefringence layer 13 to form the liquid crystal display device in FIG. 1 as the Example of the present invention, and the measurement of spectra in the obtained device was performed. In FIG. 18, in the case of $\gamma=45°$, the curve 103 shows the change of $\Delta u(\theta)$ in the direction of $\phi=0°$, 104 shows the change of $\Delta u(\theta)$ in the direction of $\phi=90°$, and in the case of $\gamma=-45°$, the curve 105 shows the change of $\Delta u(\theta)$ in the direction of $\phi=0°$, 106 shows the change of $\Delta u(\theta)$ in the direction of $\phi=90°$. And the above curves 103 and 104 relate to the liquid crystal display device of the present invention. Each refractive index and the value of $\Delta n \cdot d$ of the uniaxial orientation PET is shown in Table 3.

TABLE 3

| nx | ny | nz | $\Delta n \cdot d$ | |
|---|---|---|---|---|
| 1.6922 | 1.5903 | 1.5207 | 10.0 | (μm) |

As can be known in FIG. 18, in the case of $\gamma=45°$, the color change dependent on the visual angle is reduced by the use of birefringence layer 13 to thereby improve the visual angle characteristic. However, in the case of $\gamma=-45°$, the visual angle characteristic becomes rather unsufficient by using the birefringence layer. In the uniaxial drawing PET constituting the birefringence layer, since the relation between the refractive indexes $n_x$, $n_y$ and $n_z$ is $n_x > n_y > n_z$, the direction of the optical axis of the uniaxial drawing PET projected to the birefringence layer face becomes x direction. Therefore, in the case of $\gamma=45°$ (namely, curves 103 and 104), the angle ($\delta$) becomes 45° and it satisfies the condition (1) required for the STN type device. However, in the case of $\gamma=-45°$ (namely, curves 105 and 106), it does not satisfy the condition (1).

EXAMPLE 2

On the uniaxial drawing PET film on which the striped transparent ITO electrode was formed, polyamide film was coated to form an orientation film, and it was subjected to rubbing treatment to form the substrate. And the liquid crystal formed by mixing nematic liquid crystal with chiral nematic liquid crystal was filled between the substrates to obtain the liquid crystal cell. This cell was the example in which the substrate 7 was also formed of the uniaxial orientation PET film in the structure of FIG. 2. Then, the liquid crystal cell was sandwiched between two polarization plates to obtain the STN type liquid crystal display device.

The cell parameter was set as $\alpha=210°$, $\beta L=\beta U=45°$, $\Delta n \cdot d=0.89$ μm, $\gamma u=45°$ and $\gamma d=-45°$. The $\gamma u$ was the angle of the x direction of the upper substrate formed to the rubbing direction of the upper substrate, and the twist direction of the liquid crystal molecules from the bottom to the upside in the case of seeing the cell from the upside (namely, clockwise direction in the case of seeing it from the upside) is defined as the positive-direction. The $\gamma d$ is the angle of the x direction formed to the rubbing direction of the lower substrate, and the twist direction of the liquid crystal molecules from the upside to the bottom in the case of seeing the device from the bottom (namely, left-handed direction in the case of seeing from the bottom) is defined as the positive direction. The refractive index of the uniaxial drawing PET constituting the substrate was the same as in the Table 3.

EXAMPLE 3

The STN type liquid crystal display device having the same structure as in the example 2, was produced by providing the cell with parameters set as $\alpha=210°$, $\beta L=\beta U=45°$, $\Delta n \cdot d=0.89$ μm, $\gamma u=45°$ and $\gamma d=45°$.

COMPARATIVE EXAMPLE 1

The STN type liquid crystal display device having the same structure as in the Example 2 was produced by providing with the cell parameters set as $\alpha=210°$, $\beta L=\beta U=45°$, $\Delta n \cdot d=0.89$ μm, $\gamma u=-45°$ and $\gamma d=-45°$.

COMPARATIVE EXAMPLE 2

The substrates were obtained by forming the striped transparent ITO electrode on the glass plate, forming an orientation film of polyamide on the electrode and subjecting the film to rubbing treatment. The liquid crystal formed by mixing nematic liquid crystal with chiral nematic liquid crystal was filled between the substrates to form a liquid crystal cell. And the liquid crystal cell was sandwiched between two sheets of polarization plates to form the STN type liquid crystal display device. This device had the structure in which the birefringence layer 13 was removed from the structure of FIG. 1.

The cell parameters were set as $\alpha=210°$, $\beta L=\beta U=45°$ and $\Delta n \cdot d=0.89$ μm.

Figure 19:
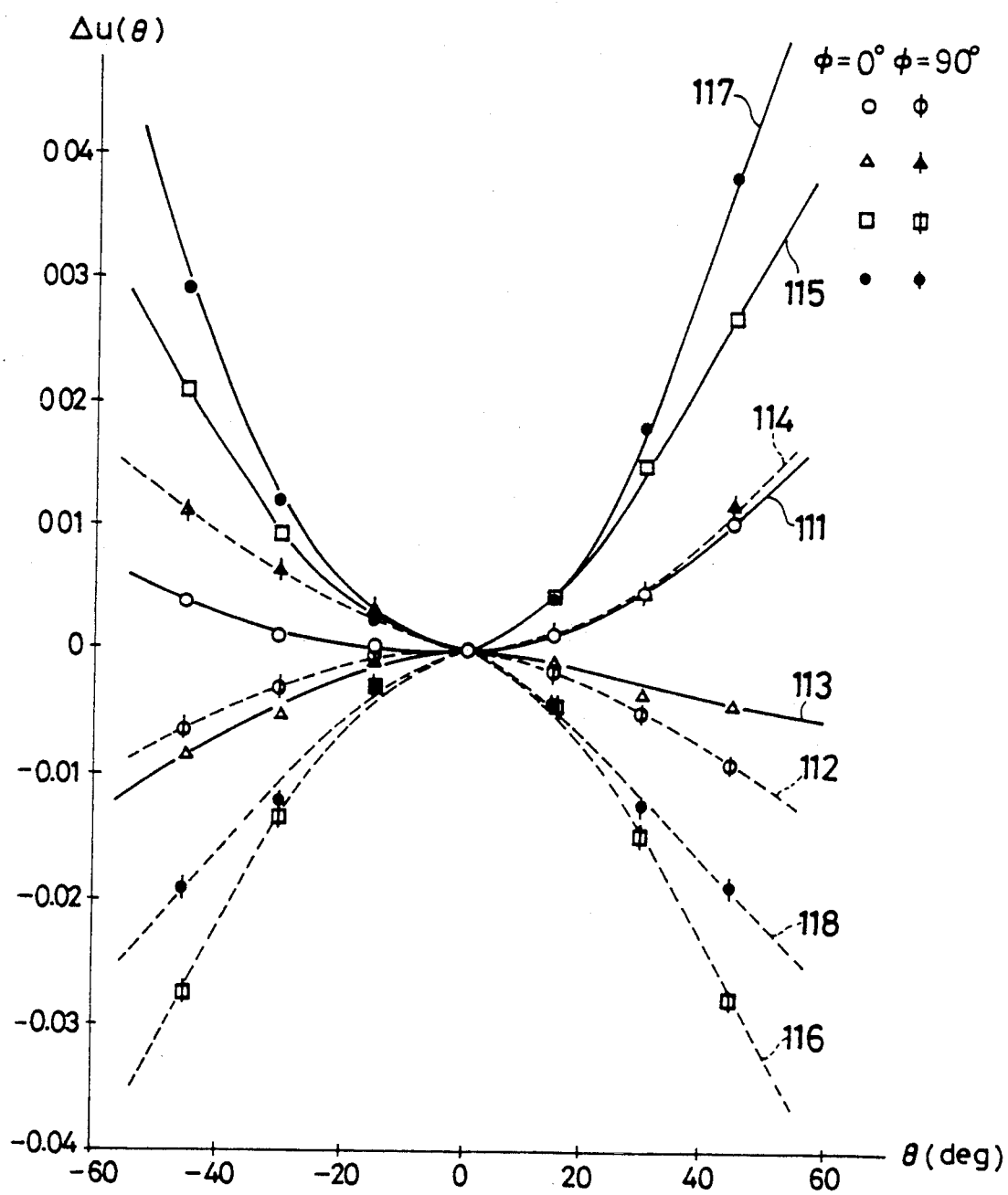

Each $\theta$ dependency of $\Delta u(\theta)$ in the Examples 2 and 3 and the Comparative Examples 1 and 2 was analyzed by the same measuring method as in the Example 1. The results are shown in FIG. 19.

The curves 111 and 112 are relating to the Example 2, and 113 and 114 are relating to the Example 3, 115 and 116 are relating to the Comparative Example 1, and 117 and 118 are relating to the Comparative Example 2.

The Example 2 shows the case that the upper substrate satisfies the condition (1) required for the STN type liquid crystal display device of the present invention, but the lower substrate does not satisfy the condition (1). In this Example, the visual angle characteristic is improved as shown in FIG. 19, because the upper substrate satisfies the condition (1). In the Example 3, both the upper and lower substrates satisfy the condition (1), therefore, the color change dependent on visual angle is small. In the Comparative Example 1, both the upper and lower substrates do not satisfy the condition (1), therefore, the color change dependent on visual angle is large. Since the birefringence layer is not used in the Comparative Example 2, the color change dependent on visual angle is large.

EXAMPLE 4

The substrate was obtained by forming the striped transparent ITO electrode on a glass plate, coating an orientation film of polyamide on the electrode, and subjecting the film to rubbing treatment. The liquid crystal formed by mixing nematic liquid crystal with chiral nematic liquid crystal was filled between the substrates to form liquid crystal cell, and the polarization plates were arranged on both sides thereof to form the STN type liquid crystal display device. The cell parameters were set as $\alpha = 160°$, $\beta L = \beta U = 45°$ and $\Delta n \cdot d = 0.98$ μm.

Figure 20:
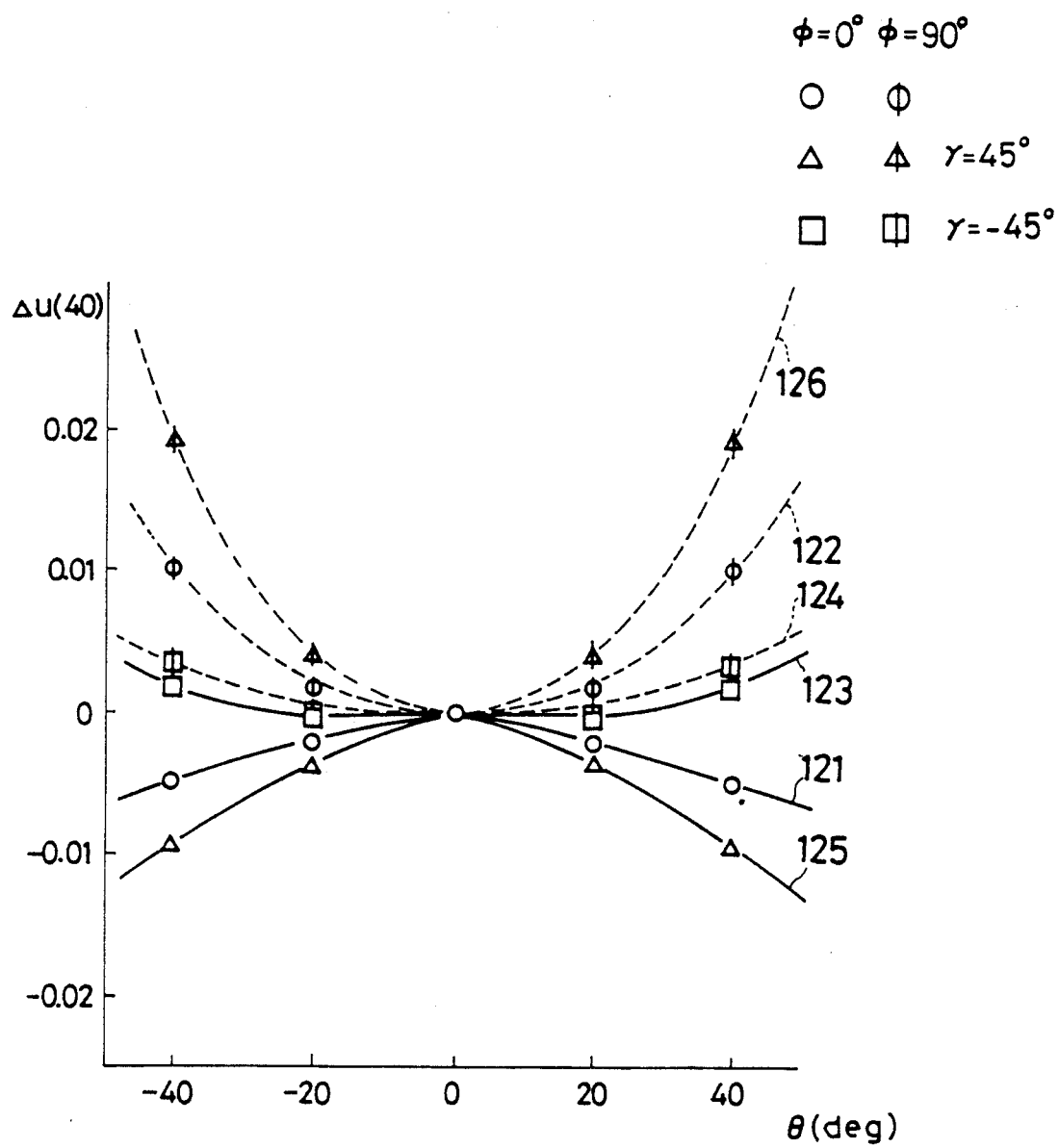

The $\theta$ dependency of $\Delta u(\theta)$ was investigated by the same measuring method as in the Example 1. The results are shown in FIG. 20. In the Figure, curves 121 and 122 show the $\theta$ dependency without birefringence layer.

Next, the uniaxial drawing PET was arranged as the birefringence layer 13 between the liquid crystal cell and polarization plate to form the liquid crystal display device as in FIG. 1, and the same measurement referred to $\theta$ dependency was performed. In FIG. 20, the curves 125 and 126 are in the case of $\gamma = 45°$, and the curves 123 and 124 are in the case of $\gamma = -45°$, and these curves 123 and 124 are related to the STN type liquid crystal display device of the present invention. The refractive index of uniaxial drawing PET was the same as in the Table 3.

As seen from FIG. 20, in the case of $\gamma = 45°$ (namely curves 125 and 126), since the condition (2) required for the STN type liquid crystal display device is not satisfied, the color change dependent on the visual angle is large, and in the case of $\gamma = -45°$ (namely curves 123 and 124), since the condition (2) is satisfied, the color change dependent on visual angle is small.

EXAMPLE 5

The substrates 4 and 7 were obtained by forming the striped transparent ITO electrode on a glass plate, forming an orientation film of polyamide on the transparent electrode, and subjecting the film to rubbing treatment. Then, the liquid crystal formed by mixing nematic liquid crystal with chiral nematic liquid crystal was filled between the substrates 4 and 7 to form liquid crystal cell 1. And the polarization plates 11 and 12 were arranged on both sides of the liquid crystal cell 1 to produce the OMI type liquid crystal display device. The cell parameters were set as $\alpha = 240°$, $\beta = 80°$, $\epsilon = 45°$ and $\Delta n \cdot d = 0.67$ μm. Then, uniaxial drawing PET was arranged as the birefringence layer 13 between the liquid crystal cell 1 and the polarization plate 11 so that the maximum refractive index direction in the PET layer face coincided with the transmission axis of the polarization plate 11, to thereby form the liquid crystal display device having the structure as shown in FIG. 1. The values of refractive index and $\Delta n \cdot d$ of the uniaxial drawing PET constituting the birefringence layer 13 are as shown in the Example 1, Table 3. The OMI type liquid crystal display device thus obtained showed smaller color change dependent on visual angle as compared with the case in which the uniaxial drawing PET as the birefringence layer 13 was not provided.

EXAMPLE 6

The substrates 4A and 7A were obtained by coating an orientation film of polyamide on a uniaxial drawing PET film on which a striped transparent ITO electrode was formed and subjecting the orientation film to rubbing treatment. The liquid crystal formed by mixing nematic liquid crystal with chiral nematic liquid crystal was filled between the substrates 4A and 7A to form liquid crystal cell 1A (namely, in FIG. 2, since also the substrate 7 was formed of the uniaxial drawing PET film, numeral 7 is shown as 7A). And the polarization plates 11 and 12 were arranged on both sides of the liquid crystal cell 1A to produce the OMI type liquid crystal display device. The cell parameters were set as $\alpha = 220°$, $\beta = 80°$, $\epsilon = 45°$ and $\Delta n \cdot d = 0.65$ μm. Further, the refractive index of uniaxial drawing PET film for the substrate and the value of $\Delta n \cdot d$ were the same as those of the PET film for the birefringence layer 13 used in the Example 5. In the OMI type liquid crystal display device thus produced, the color change dependent on visual angle becomes smaller as compared with the OMI type liquid crystal display device provided with the glass substrate (cell parameter is same).

EXAMPLE 7

The liquid crystal cell was obtained by forming a polyimide type orientation film on the glass substrate on which a striped transparent electrode was formed, subjecting the film to rubbing treatment, affixing the two substrates together and filling therebetween with the nematic liquid crystal (ZLI-2293, product of MERK & CO., INC.). The cell parameter was the same as in the Table 2. On investigating the liquid crystal cell, the color of the cell was remarkably changed dependent on the visual angle direction.

When a pair of polarization plates were arranged on both sides of the liquid crystal cell thus obtained, the uniaxial drawing polyester film was sandwiched between the upper polarization plate and the upper substrate of the liquid crystal cell so that the maximum refractive index direction in the layer face coincided with the transmission axis of polarization plate, to thereby produce the ECB type liquid crystal display device of the present invention. On investigating the obtained device, the visual angle dependency of the cell color was remarkably improved.

EXAMPLE 8

One of the two glass substrates of the liquid crystal cell in the Example 7 was changed into the substrate formed of a birefringence polymer layer to form the liquid crystal cell, and the liquid crystal cell was sandwiched between the two polarization plates to produce the ECB type liquid crystal display device of the present invention, and on investigating the device, the visual dependency of the cell color could be decreased without any additional procedure.

What is claimed is:

1. A liquid crystal display device, comprising:
   (1) a liquid crystal cell wherein a liquid crystal layer comprising a liquid crystal composition having positive dielectric anisotropy is sandwiched between a pair of substrates having at least one electrode, and liquid crystal molecules of the composition are oriented substantially parallel to a surface of one substrate and twisted at an angle of not less than 180° in a perpendicular direction to the substrate surface when an electric voltage is off;
   (2) a pair of polarizers arranged to sandwich the liquid crystal cell; and
   (3) a birefringence layer provided between the liquid crystal cell and a first polarizer at at least one side of the cell;
   wherein a direction of transmission axis of the first polarizer is shifted from an orientation direction of the liquid crystal molecules adjacent to the first polarizer, an angle formed between a maximum refractive index direction of the birefringence layer and a direction of transmission axis of the first polarizer adjacent to the birefringence layer is not more than 5°, and a smaller angle of the two which are formed between an orientation direction of the liquid crystal molecules adjacent to the birefringence layer and directions of optical axes of the birefringence layer is in a range of 0° to 90°, when the three directions are projected on the birefringence layer surface, provided that the twist direction of the liquid crystal molecules to the side of the birefringence layer is positive.

2. A liquid crystal display device, comprising:
   (1) a liquid crystal cell wherein a liquid crystal layer comprising a liquid crystal composition having positive dielectric anisotropy is sandwiched between a pair of substrates having at least one electrode, and liquid crystal molecules of the composition are oriented substantially parallel to a surface of one substrate and twisted at an angle of not less than 180° in a perpendicular direction to the substrate surface when an electric voltage is off;
   (2) a pair of polarizers arranged to sandwich the liquid crystal cell; and
   (3) a birefringence layer provided between the liquid crystal cell and a first polarizer at at least one side of the cell;
   wherein a direction of transmission axis of the first polarizer is shifted from an orientation direction of the liquid crystal molecules adjacent to the first polarizer, an angle formed between a maximum refractive index direction of the birefringence layer and a direction of transmission axis of the first polarizer adjacent to the birefringence layer is not more than 5°, and a smaller angle of the two which are formed between an orientation direction of the liquid crystal molecules adjacent to the birefringence layer and directions of optical axes of the birefringence layer is in a range of 0° to 90°, when the three directions are projected on the birefringence layer surface, provided that the twist direction of the liquid crystal molecules to the side of the birefringence layer is negative.

3. A liquid crystal display device, comprising:
   (1) a liquid crystal cell wherein a liquid crystal layer comprising a liquid crystal composition having positive dielectric anisotropy is sandwiched between a pair of substrates having at least one electrode, and liquid crystal molecules of the composition are oriented substantially parallel to a surface of one substrate and twisted at an angle of not less than 180° in a perpendicular direction to the substrate surface when an electric voltage is off;
   (2) a pair of polarizers arranged to sandwich the liquid crystal cell; and
   (3) a birefringence layer provided between the liquid crystal cell and a first polarizer at at least one side of the cell;
   wherein a product of a refractive index anisotropy of the liquid crystal composition and a thickness of the liquid crystal layer at normal temperature is in a range of 0.4 to 0.9 $\mu$m, and an angle formed between a transmission axis of the first polarizer adjacent to the one substrate (a) and a transmission axis of the other polarizer adjacent to the other substrate (b) is in the range of 60° to 90°, provided that the twisted direction of the liquid crystal molecules from (b) to (a) is positive, an angle formed between an orientation direction of the liquid crystal molecules at a center of thickness of the layer and a bisector of an angle formed between the transmission axes of both polarizers is in a range of 30° to 60°, and an angle formed between a maximum refractive index direction of the birefringence layer and a direction of transmission axis or absorption axis of the first polarizer adjacent to the birefringence layer is not more than 5°.

4. A liquid crystal display device, comprising:
   (1) a liquid crystal cell wherein a liquid crystal layer comprising a liquid crystal composition having positive dielectric anisotropy is sandwiched between a pair of substrates having at least one electrode, and liquid crystal molecules of the composition are oriented substantially parallel to a surface of one substrate and twisted at an angle of not less than 180° in a perpendicular direction to the substrate surface when an electric voltage is off;
   (2) a pair of polarizers arranged to sandwich the liquid crystal cell; and
   (3) a birefringence layer provided between the liquid crystal cell and a first polarizer at at least one side of the cell;
   wherein an angle formed between a maximum refractive index direction of the birefringence layer and a direction of transmission axis of the first polarizer adjacent to the birefringence layer is not more than 5°.

5. The liquid crystal display device according to any one of claims 1 to 4, wherein at least one of the substrates has a birefringence property.

* * * * *